United States Patent
Okayama et al.

[11] Patent Number: 5,978,152
[45] Date of Patent: Nov. 2, 1999

[54] ZOOM LENS SYSTEM

[75] Inventors: Hiroaki Okayama, Yamatotakada; Shusuke Ono, Takatsuki; Hisayuki Ii, Sakai; Tsuyoshi Kakimoto, Katano, all of Japan

[73] Assignee: Matsushita Electric Industrial Co., Ltd., Osaka-Fu, Japan

[21] Appl. No.: 08/973,731

[22] PCT Filed: Apr. 8, 1997

[86] PCT No.: PCT/JP97/01210

§ 371 Date: Feb. 12, 1998

§ 102(e) Date: Feb. 12, 1998

[87] PCT Pub. No.: WO97/38340

PCT Pub. Date: Oct. 16, 1997

[30] Foreign Application Priority Data

Apr. 10, 1996 [JP] Japan ................................. 8-114092

[51] Int. Cl.⁶ .................................................. G02B 15/14
[52] U.S. Cl. .......................................... 359/687; 359/683
[58] Field of Search ................................. 359/687, 683, 359/708, 713–715

[56] References Cited

U.S. PATENT DOCUMENTS 5,313,331  5/1994  Mihara ..................................... 359/687

FOREIGN PATENT DOCUMENTS

| | | |
|---|---|---|
| 4-43311 | 2/1972 | Japan . |
| 4-153615 | 5/1992 | Japan . |
| 5-27167 | 2/1993 | Japan . |
| 5-134178 | 5/1993 | Japan . |

*Primary Examiner*—Georgia Epps
*Assistant Examiner*—Jordan M. Schwartz
*Attorney, Agent, or Firm*—Akin, Gump, Strauss, Hauer & Feld, L.L.P.

[57] ABSTRACT

A very compact zoom lens system is provided which has a zoom ratio of 10×, a bright f-number of 1.4 and a wide angle of view of 59 degree or greater although having a fewer number of lens. The zoom lens system comprises from the object side to the image side: a fixed first lens unit having a negative power lens, a positive power lens and a positive power meniscus lens; a second lens unit having an aspherical surface, having a negative power lens, a negative power biconcave lens and a positive power lens and performing zooming by moving; a fixed third lens unit having an aspherical surface and having a positive power lens, a positive power lens and a negative power lens; and a fourth lens unit having an aspherical surface, having positive power and moves according to zooming and a movement of an object point. The image side surface of the most image side lens of the third lens unit is a concave surface having strong power to the image side. When the focal length at the wide-angle limit is fw, the angle of view at the wide-angle limit is ω, the focal length of the first lens unit is f1 and the focal length of the second lens unit is f2, the following condition is satisfied:

$$0.17 < (fw \times \tan\omega)/(f1 \times |f2|)^{1/2} < 0.39.$$

12 Claims, 32 Drawing Sheets

ZOOM LENS SYSTEM

This application is a 371 of PCT/JP97/01210, Apr. 8, 1997.

TECHNICAL FIELD

The present invention relates to a zoom lens system for use in a single-plate video camera, etc., having a wide angle of view (59 degree or greater) and a high zoom ratio (approximately 10×).

BACKGROUND ART

Size reduction of image pickup devices and size reduction of lens systems is greatly demanded in today's video camera market. Moreover, it is an important factor that electronic still-video cameras which have appeared in recent years with the spread of multimedia personal computers are inexpensive and small in size. On the contrary, for the manufacturers, it is necessary to reduce the cost in order to have competitive power in the market. In order to reduce lens systems in cost, it is necessary to provide a construction of lens system which has a minimum number of lens elements and is capable of maintaining performance the same as or higher than that of conventional lens systems while having a minimum number of lens elements.

For these reasons, it has conventionally been a problem how a zoom lens system is provided to be is small in size and high in resolution but has a fewer number of lens elements.

A conventional zoom lens system will be described.

FIG. 32 is a view showing the structure of a conventional zoom lens system for use in a video camera described, for example, in Japanese Laid-open Patent Publication Number Hei 6-109975. The zoom lens system shown in the figure comprises a first lens unit 321 serving as a condenser unit, a second lens unit 322 serving as a zooming unit, a third lens unit 323 serving as a condenser unit, a fourth lens unit 324 serving as a focusing unit, an equivalent glass plate 325 corresponding to a crystal filter or a faceplate of an image pickup element, etc., and an image forming plane 326.

The first lens unit 321 fixed in relation to the image forming plane 326 has imaging function, and the second lens unit 322 moved back and forth along the optical axis varies the magnification thereby to vary the focal length of the overall lens system. The third lens unit 323 which is a stationary unit condenses light diverged by the second lens unit 322, and the fourth lens unit 324 moved back and forth along the optical axis has focusing function. Moreover, the variation in position of the image plane caused by the movement of the second lens unit 322 during zooming is corrected by the movement of the fourth lens unit 324 so as to image in a fixed position, whereby the image plane is always maintained in a fixed position.

However, in the conventional zoom lens system as described above, what is called f-number is 1.6 or higher although the number of lens elements is ten and the zoom ratio is approximately 10×. Therefore, it cannot cope with the insufficient sensitivity which is a problem in reducing of image size. Moreover, although having a small number of lens elements, its overall length is comparatively large and it lacks compactness. For this reason, it is a problem that the conventional zoom lens system cannot fulfill the harsh demand for zoom lens systems for video cameras which is to be smaller in size and has higher performance. Moreover, it is difficult for the conventional zoom lens design technique to produce a zoom lens system which fulfills all of a large aperture, a high magnification, a smaller size and a higher resolution.

DISCLOSURE OF INVENTION

The present invention is intended for solving the above-mentioned problems and an object of the present invention is to provide a very compact zoom lens system with an f-number of approximately 1.4 and a zoom ratio of approximately 10× although having a simple lens arrangement including ten lens elements, by employing an optimum lens arrangement and an optimum aspherical configuration. Another object is to provide a small-size video camera and a small-size electronic still camera, etc. using the zoom lens system.

A zoom lens system of the present invention is that, in a certain structure having a first lens unit to a fourth lens unit, the respective lens units are structured as follows.

The first lens unit comprises, from the object side, a lens element having negative refractive power, a lens element having positive refractive power and a meniscus lens element having positive refractive power and convex to the object side.

The second lens unit comprises, from the object side, a lens element having negative refractive power, a biconcave lens element having negative refractive power and a lens element convex to object side surface connected to the biconcave lens element and having positive refractive power, and at least one of the surfaces of the lens elements is aspherical.

The third lens unit comprises, from the object side, a lens element having positive refractive power, a lens element having positive refractive power and a lens element having negative refractive power, and at least one of the surfaces of the lens elements is aspherical.

The fourth lens unit comprises at least one lens element, and at least one of the surfaces of the lens element is aspherical. Moreover, when the focal length at the wide-angle limit is fw, the half view angle at the wide-angle limit is ω, the focal length of the first lens unit is f1 and the focal length of the second lens unit is f2, the following is satisfied:

$$0.17 < (fw \times \tan\omega)/(f1 \times |f2|)^{1/2} < 0.39$$

By the interaction among the above-described lens units, a compact zoom lens system in which aberration is sufficiently corrected, the angle of view at the wide-angle limit is approximately 59 degree and the zoom ratio is approximately 10× is obtained with a simple structure.

A zoom lens system of the present invention comprises, from the side of an object which is a subject: a first lens unit having positive refractive power and fixed in relation to an image plane; a second lens unit having negative refractive power and performing zooming by moving along the optical axis; a third lens unit having positive refractive power which is fixed in relation to the image plane and performs condensing; and a fourth lens unit having positive refractive power which moves along the optical axis so that the image plane varied according to the movement of the second lens unit and a movement of the object which is the subject is maintained in a certain position in relation to a reference plane, wherein the first lens unit comprises, from the object side: a first lens element of the first lens unit having negative refractive power; a second lens element of the first lens unit having positive refractive power; and a meniscus lens element having positive refractive power and convex to the object side;

wherein the second lens unit comprises, from the object side: a first lens element of the second lens unit having negative refractive power; a biconcave lens element having negative refractive power; and a second lens element of the second lens unit having positive refractive power which is convex to object side surface connected to the biconcave lens element, at least one of the surfaces of the lens elements is aspherical, wherein the third lens unit comprises, from the object side: a first lens element of the third lens unit having positive refractive power; a second lens element of the third lens unit having positive refractive power; and a third lens element of the third lens unit having negative refractive power, at least one of the surfaces of the lens elements is aspherical, wherein the fourth lens unit comprises at least one lens element of the fourth lens unit, at least one of the surfaces of the lens element of the fourth lens unit is aspherical, and wherein, when the focal length of the zoom lens system at the wide-angle limit is fw, the half view angle at the wide-angle limit is ω, the focal length of the first lens unit is f1 and the focal length of the second lens unit is f2, the following is satisfied:

$$0.17 < (fw \times \tan\omega)/(f1 \times |f2|)^{1/2} < 0.39 \qquad (1)$$

The conditional expression (1) is an expression regarding the back focal length and the angle of view, and when the value of $(fw \times \tan\omega)/(f1 \times |f2|)^{1/2}$ is lower than the lower limit of the conditional expression (1), a sufficient back focal length is not obtained although the angle of view increases. On the contrary, when the value of $(fw \times \tan\omega)/(f1 \times |f2|)^{1/2}$ exceeds the upper limit of the conditional expression (1), a wide angle of view is not obtained although a sufficient back focal length is obtained. That is, by setting the value so that the conditional expression (1) is satisfied, a sufficient back focal length and a wide angle of view (59 degree or greater) are obtained.

In the above-mentioned arrangement, when p3c is the refractive power of the image side surface of the third lens element of the third lens unit and fw is the focal length of the entire zoom lens system at the wide-angle limit, the following is preferably satisfied:

$$0.40 < fw \times |p3c| < 1.04 \qquad (2)$$

Here, the refractive power of a surface is a value obtained by (n2−n1)/r where the refractive power of a medium on the incident side of the surface is n1, the refractive power of a medium on the exit side of the surface is n2 and the radius of curvature of the surface is r.

The conditional expression (2) is an expression regarding the f-number and the back focal length and is closely related to the compactness of the zoom lens system. When the value of fw×|p3c| is lower than the lower limit of the conditional expression (2), a sufficient back focal length is not obtained although a low f-number is secured. On the contrary, when the value of fw×|p3c| exceeds the upper limit of the conditional expression (2), the back focal length increases to secure a sufficient f-number, so that the compactness of the zoom lens system is impaired. That is, by setting the value so that the conditional expression (2) is satisfied, a zoom lens system is obtained which is very compact in size while securing sufficient f-number and back focal length.

Preferably, in the third lens unit, the first lens element of the third lens unit is a biconvex lens; the second lens element of the third lens unit is disposed so as to be convex to the object side; the third lens element of the third lens unit has its object side surface connected to the second lens element of the third lens unit and has its image side surface formed to be concave; and the overall refractive power of the second lens element of the third lens unit and the third lens element of the third lens unit connected each other is negative.

In the third lens unit, it may be so that the first lens element of the third lens unit is a biconvex lens; the second lens element of the third lens unit is disposed so as to be convex to the object side; and the third lens element of the third lens unit has its image side surface formed to concave, and these lens elements are disposed with spaces therebetween.

Preferably, in the above-mentioned arrangements, when fw is the focal length at the wide-angle limit and fi (i=1, 2, 3, 4) is the focal length of an ith lens unit, the following conditional expressions (3) to (6) are satisfied:

$$0.14 < fw/f1 < 0.31 \qquad (3)$$

$$0.76 < fw/|f2| < 1.57 \qquad (4)$$

$$0.30 < fw/f3 < 0.59 \qquad (5)$$

$$0.26 < fw/f4 < 0.55 \qquad (6)$$

The conditional expressions (3) to (6) are conditional expressions which define the refractive power of the respective lens units, and by satisfying these conditional expressions, a strong refractive power is obtained which realizes the compactness of the zoom lens system.

Moreover, when fw is the focal length at the wide-angle limit, fi (i=1, 2, 3, 4) is the focal length of an ith lens unit, ω is the half view angle at the wide-angle limit and p3c is the refractive power of the image side surface of the third lens element of the third lens unit, it is more desirable that the following conditional expressions (7) to (12) be satisfied:

$$0.255 < (fw \times \tan\omega)/(f1 \times |f2|)^{1/2} < 0.301 \qquad (7)$$

$$0.643 < fw \times |p3c| < 0.799 \qquad (8)$$

$$0.212 < fw/f1 < 0.232 \qquad (9)$$

$$1.081 < fw/|f2| < 1.205 \qquad (10)$$

$$0.434 < fw/f3 < 0.453 \qquad (11)$$

$$0.376 < fw/f4 < 0.421 \qquad (12)$$

Preferably, in the first lens element of the third lens unit, the second lens element of the third lens unit and the third lens element of the third lens unit, when the focal length of the first lens element of the third lens unit is f31 and the composite focal length of the second lens element of the third lens unit and the third lens element of the third lens unit is f323, the third lens unit satisfies the following:

$$0.34 < f31/|f323| < 1.05 \qquad (13)$$

The conditional expression (13) is a conditional expression regarding the back focal length and the f-number, and when the value of f31/|f323| is lower than the lower limit of the conditional expression (13), the diameter of the third lens unit 3 increases to secure a sufficient f-number, and in addition, since the back focal length increases, a compact zoom lens system cannot be realized. Moreover, when the value of f31/|f323| exceeds the upper limit of the conditional expression (13), a sufficient back focal length is not obtained although a sufficient f-number is secured. That is, by structuring so that the conditional expression (13) is satisfied, a sufficient back focal length is obtained in spite of the compact structure.

When the local radius of curvature at an aperture 10% of the effective aperture of the object side aspherical surface of the first lens element of the third lens unit is r311, the local radius of curvature at an aperture 90% of the effective aperture of the object side aspherical surface of the first lens element of the third lens unit is r319, the local radius of curvature at an aperture 10% of the effective aperture of the image side aspherical surface of the first lens element of the third lens unit is r321, the local radius of curvature at an aperture 90% of the effective aperture of the image side aspherical surface of the first lens element of the third lens unit is r329, the radius of curvature at an aperture 10% of the effective aperture of the object side aspherical surface of the biconcave lens element of the second lens unit is r211, the local radius of curvature at an aperture 90% of the effective aperture of the object side aspherical surface of the biconcave lens element of the second lens unit is r219, and the lens element of the fourth lens unit has an aspherical surface on its object side surface, the local radius of curvature at an aperture 10% of the effective aperture of the lens element is r411 and the local radius of curvature at an aperture 90% of the effective aperture of the lens element is r419, or the lens element of the fourth lens unit has an aspherical surface on its image side surface, the local radius of curvature at an aperture 10% of the effective aperture of the lens element is r421 and the local radius of curvature at an aperture 90% of the effective aperture of the lens element is r429, it is desirable that the following conditional expressions (14) to (18) be satisfied:

$$0.29 < r311/r319 < 1.00 \quad (14)$$

$$0.14 < r321/r329 < 0.72 \quad (15)$$

$$0.74 < r211/r219 < 1.52 \quad (16)$$

and $$0.34 < r411/r419 < 1.03 \quad (17)$$

or $$0.64 < r421/r429 < 1.91 \quad (18)$$

The local radius of curvature is a value obtained by executing an algebraic calculation based on an aspherical coefficient calculated from the amount of sag of the surface configuration (amount of displacement from a reference surface).

The conditional expressions (14) to (18) are conditional expressions which define the aspherical amount and are conditions for obtaining a sufficient aberration correction capability to realize a high resolution of the zoom lens system.

Moreover, when the local radius of curvature at an aperture 10% of the effective aperture of the object side aspherical surface of the first lens element of the third lens unit is r311, the local radius of curvature at an aperture 90% of the effective aperture of the object side aspherical surface of the first lens element of the third lens unit is r319, the local radius of curvature at an aperture 10% of the effective aperture of the image side aspherical surface of the first lens element of the third lens unit is r321, the local radius of curvature at an aperture 90% of the effective aperture of the image side aspherical surface of the first lens element of the third lens unit is r329, the radius of curvature at an aperture 10% of the effective aperture of the object side aspherical surface of the biconcave lens element of the second lens unit is r211, the local radius of curvature at an aperture 90% of the effective aperture of the object side aspherical surface of the biconcave lens element of the second lens unit is r219, and the lens element of the fourth lens unit has an aspherical surface on its object side surface, the local radius of curvature at an aperture 10% of the effective aperture of the lens element is r411 and the local radius of curvature at an aperture 90% of the effective aperture of the lens element is r419, or the lens element of the fourth lens unit has an aspherical surface on its image side surface, the local radius of curvature at an aperture 10% of the effective aperture of the lens element is r421 and the local radius of curvature at an aperture 90% of the effective aperture of the lens element is r429, it is more desirable that the following conditions (20) to (25) be satisfied:

$$0.492 < f31/|f323| < 0.827 \quad (20)$$

$$0.412 < r311/r319 < 0.767 \quad (21)$$

$$0.193 < r321/r329 < 0.551 \quad (22)$$

$$1.059 < r211/r219 < 1.170 \quad (23)$$

and $$0.490 < r411/r419 < 0.787 \quad (24)$$

or $$0.915 < r421/r429 < 1.470 \quad (25)$$

(Please note that (19) is skipped.)

A video camera or an electronic still camera of the present invention uses a zoom lens system having any of the above-described structures.

Novel features of the invention are particularly described in the appended claims, and structures and contents of the present invention, together with other objects and features, will be more clearly understood from the following detailed description given with reference to the drawings.

BEST MODE FOR CARRYING OUT THE INVENTION

Hereinafter, embodiments of the zoom lens system of the present invention will be described in detail with reference to the drawings.

<<First Embodiment>>

Figure 1:
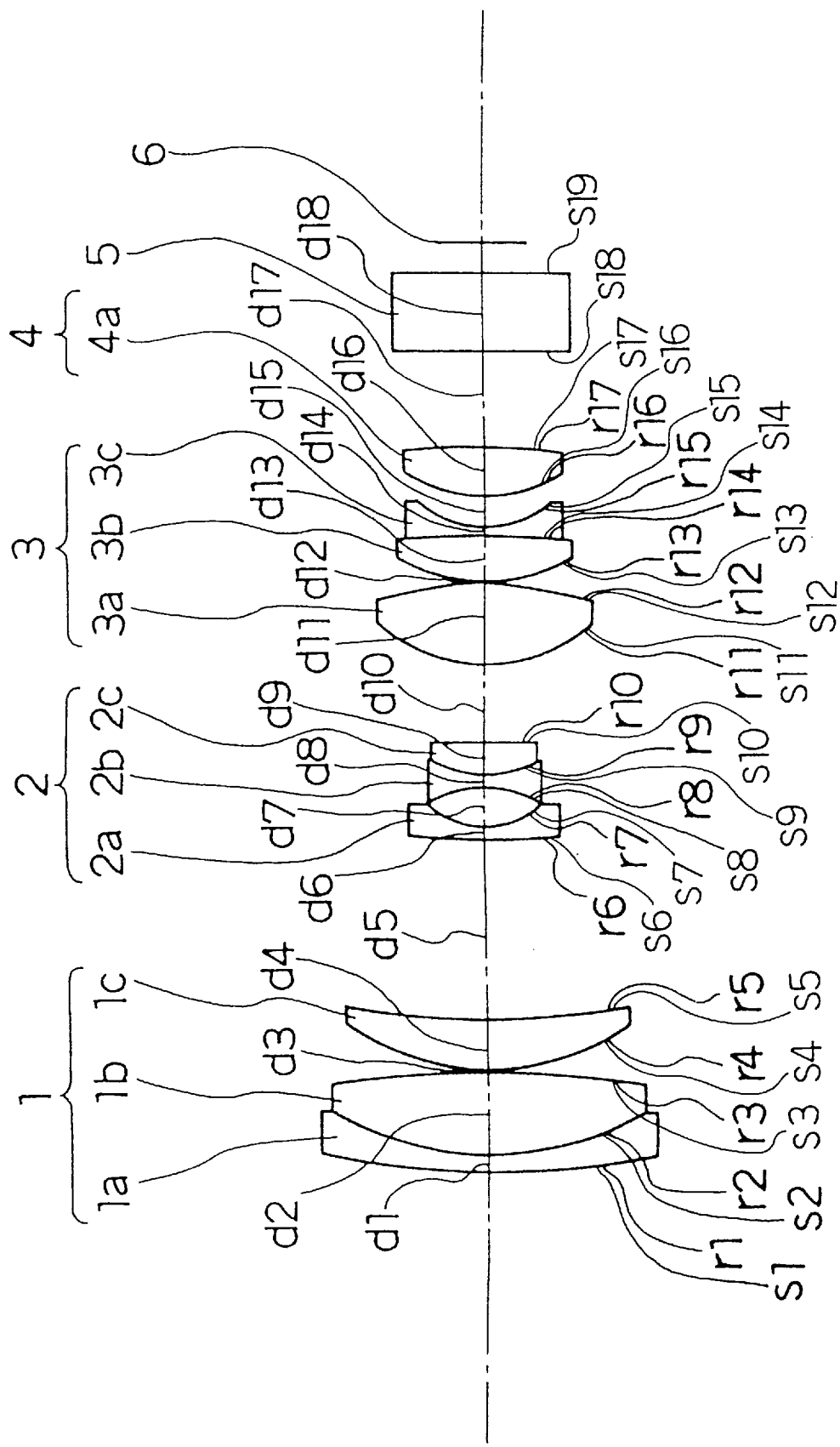
FIG. 1 is a view showing the structure of a zoom lens system according to a first embodiment of the present invention.

FIG. 1 is a view showing the structure of a zoom lens system according to a first embodiment. The zoom lens system shown in FIG. 1 comprises, from the object side (the left side of the figure): a first lens unit 1 having positive refractive power and fixed in relation to an image plane 6; a second lens unit 2 having negative refractive power and performing zooming by moving back and forth along the optical axis; a third lens unit 3 having positive refractive power which is fixed in relation to the image plane and performs condensing; and a fourth lens unit 4 having positive refractive power which moves along the optical axis so that the image plane varying responding to the movement of the second lens unit 2 and a movement of the object which is the subject is maintained in a certain position in relation to a reference plane. Moreover, between the fourth lens unit 4 and the image plane 6, a flat plate 5 is placed which is equivalent to an optical low-pass filter or a faceplate of an image pickup device, etc.

The first lens unit 1 comprises, from the object side: a lens element 1a having negative refractive power; a lens element 1b having positive refractive power; and a meniscus lens element 1c convex to the object side and having positive refractive power.

The second lens unit 2 comprises, from the object side: a lens element 2a having negative refractive power; a biconcave lens element 2b having negative refractive power; and a lens element 2c convex to object side surface connect to the biconcave lens element 2b and having positive refractive power. At least one of the respective surfaces of the lens elements of the second lens unit 2 is aspherical.

The third lens unit 3 comprises, from the object side: a biconvex lens element 3a having positive refractive power and whose both side surfaces are aspherical; a lens element 3b convex to the object side and having positive refractive power; and a lens element 3c having negative refractive power. The lens element 3b having positive refractive power and the lens element 3c having negative refractive power are connected each other. The positive refractive power of the biconvex lens element 3a is set comparatively stronger than the refractive power corresponding to the composite focal length of the lens elements 3b and 3c connected each other. With this setting, a sufficient back focal length is obtained and aberration is sufficiently corrected although the lens system is very compact in size.

The fourth lens unit 4 comprises one biconvex lens element 4a and at least one of the surfaces of the lens element 4a is aspherical.

In FIG. 1, Si (i=1, - - -, 19) represents the surface number of the respective lens elements, ri (i=1, - - -, 17) represents the radius of curvature of the respective lens elements, dk (k=1, - - -, 18) represents the thickness of the lens elements or the air spaces between the lens elements. The connecting surfaces of two lens elements and the radii of curvature thereof are designated by the same numbers.

When the focal length at the wide-angle limit is fw, the focal length of the first lens unit 1 is f1, the focal length of the second lens unit 2 is f2 and the angle of view at the wide-angle limit is ω, the following is satisfied:

$$0.255 < (fw \times \tan\omega)/(f1 \times |f2|)^{1/2} < 0.301 \qquad (7)$$

The conditional expression (7) is a expression regarding the back focal length and the angle of view, and when the value of $(fw \times \tan\omega)/(f1 \times |f2|)^{1/2}$ is lower than the lower limit of the conditional expression (7), a sufficient back focal length is not obtained although the angle of view increases. On the contrary, when the value of $(fw \times \tan\omega)/(f1 \times |f2|)^{1/2}$ exceeds the upper limit of the conditional expression (7), a wide angle of view is not obtained although a sufficient back focal length is obtained.

<<Second Embodiment>>

Figure 2:
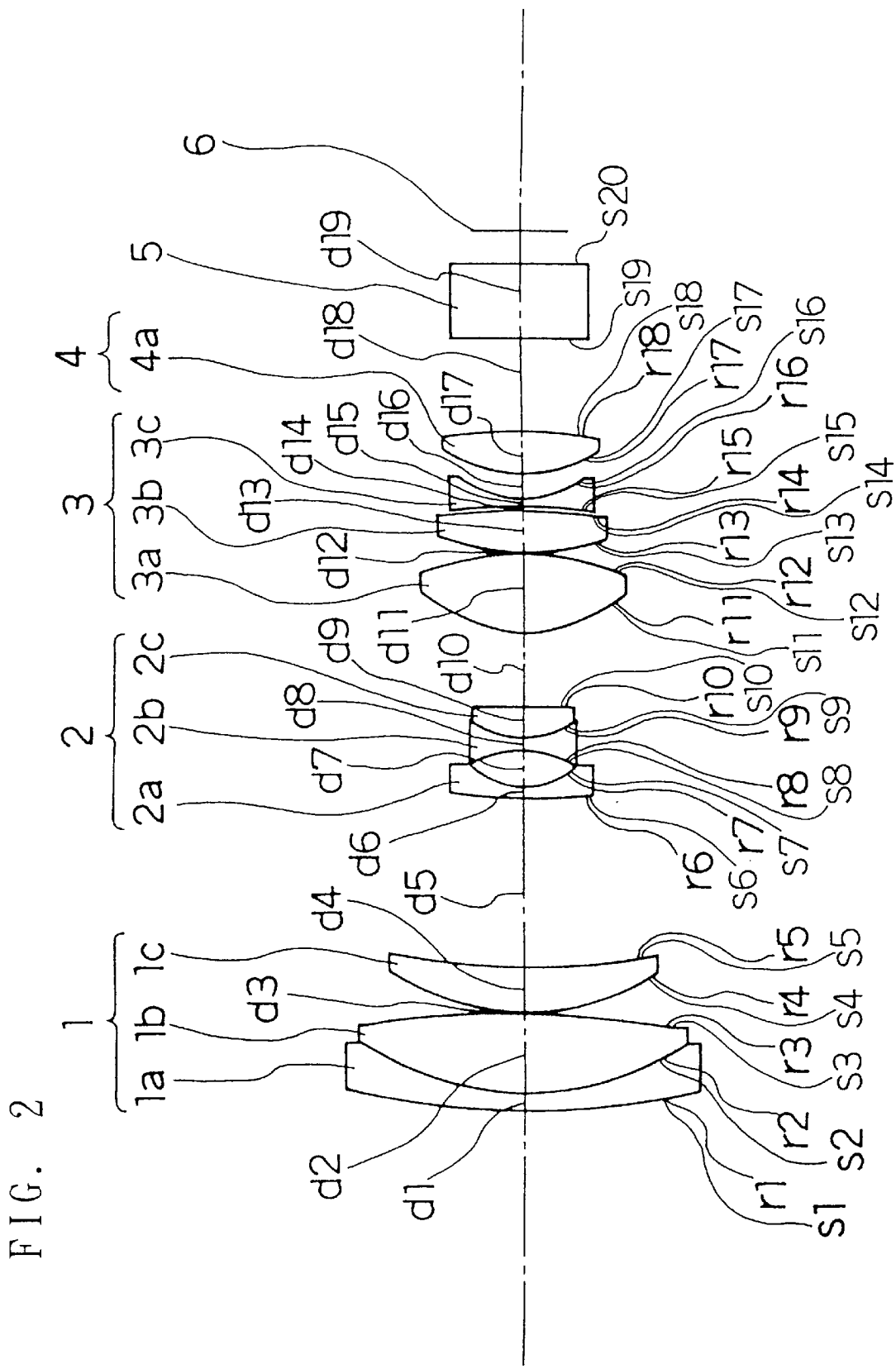
FIG. 2 is a view showing the structure of a zoom lens system according to a second embodiment of the present invention.

FIG. 2 is a view showing the structure of a zoom lens system according to a second embodiment. The zoom lens system shown in FIG. 2 comprises, from the object side (the left side of the figure): a first lens unit 1 having positive refractive power and fixed in relation to an image plane 6; a second lens unit 2 having negative refractive power and performing zooming by moving back and forth along the optical axis; a third lens unit 3 having positive refractive power which is fixed in relation to the image plane and performing condensing; and a fourth lens unit 4 having positive refractive power which moves along the optical axis so that the image plane varying responding to the movement of the second lens unit 2 and a movement of the object which is the subject is maintained in a certain position in relation to a reference plane. Moreover, between the fourth lens unit 4 and the image plane 6, a flat plate 5 is placed which is equivalent to an optical low-pass filter or a faceplate of an image pickup device, etc.

The first lens unit 1 comprises, from the object side: a lens element 1a having negative refractive power; a lens element 1b having positive refractive power; and a meniscus lens element 1c convex to the object side which has positive refractive power.

The second lens unit 2 comprises, from the object side: a lens element 2a having negative refractive power; a biconcave lens element 2b having negative refractive power; and a lens element 2c convex to object side surface connected to the biconcave lens element 2b and having positive refractive power. At least one of the surfaces of the lens elements of the second lens unit 2 is aspherical.

The third lens unit 3 comprises, from the object side: a biconvex lens element 3a having positive refractive power and whose both side surfaces are aspherical; a lens element 3b having positive refractive power which is convex to the object side; and a lens element 3c having negative refractive power. The lens element 3b having positive refractive power and the lens element 3c having negative refractive power are disposed with a slight air space therebetween unlike the first embodiment in which they are connected. The refractive power of the biconvex lens element 3a is set comparatively stronger than the composite refractive power of the lens elements 3b and 3c. With this setting, a sufficient back focal length is obtained and aberration is sufficiently corrected although the lens system is very compact in size.

The fourth lens unit 4 comprises one biconvex lens element 4a and at least one of the surfaces of the lens element 4a is aspherical.

In FIG. 2, Si (i=1, - - - , 20) represents the surface number of the respective lens elements, ri (i=1, - - - , 18) represents the radius of curvature of the respective lens elements, dk (k=1, - - - , 19) represents the thickness of the lens elements or the air spaces between the lens elements. The connecting surfaces of two lens elements and the radii of curvature thereof are designated by the same numbers.

When the focal length at the wide-angle limit is fw, the focal length of the first lens unit is f1, the focal length of the second lens unit is f2 and the angle of view at the wide-angle limit is ω, the following relationship is satisfied:

$$0.255 < (fw \times \tan\omega)/(f1 \times |f2|)^{1/2} < 0.301 \qquad (7)$$

The conditional expression (7) is an expression regarding the back focal length and the angle of view, and when the value of $(fw \times \tan\omega)/(f1 \times |f2|)^{1/2}$ is lower than the lower limit of the conditional expression (7), a sufficient back focal length is not obtained although the angle of view increases. On the contrary, when the value of $(fw \times \tan\omega)/(f1 \times |f2|)^{1/2}$ exceeds the upper limit of the conditional expression (7), a wide angle of view is not obtained although a sufficient back focal length is obtained.

<<Supplemental Remarks Common to the First and Second Embodiments>>

The above-mentioned first and second embodiments both satisfy the following condition:

$$0.643 < fw \times |p3c| < 0.799 \qquad (8)$$

The conditional expression (8) is an expression regarding the f-number and the back focal length and is closely related to the compactness of the zoom lens system. When the value of fw×|p3c| is lower than the lower limit of the conditional expression (8), a sufficient back focal length is not obtained although a low f-number is secured. On the contrary, when the value of fw×|p3c| exceeds the upper limit of the conditional expression (8), the back focal length increases in order to secure a sufficient f-number, so that the compactness is impaired. However, in these embodiments, since fw×|p3c| is set so as to satisfy the conditional expression (8), a zoom lens system is obtained which is very compact in size while securing sufficient f-number and back focal length.

The focal lengths fi (i=1, - - - , 4) of the first to fourth lens units are set by the following conditions when the focal length at the wide-angle limit is fw:

$$0.212 < fw/f1 < 0.232 \qquad (9)$$

$$1.081 < fw/|f2| < 1.205 \qquad (10)$$

$$0.434 < fw/f3 < 0.453 \qquad (11)$$

$$0.376 < fw/f4 < 0.421 \qquad (12)$$

The conditional expressions (9) to (12) are conditional expressions which define the refractive power of the respective lens units and provide a strong refractive power which achieves the compactness of the zoom lens system.

In the conditional expression (9) regarding the refractive power of the first lens unit 1, when the value of fw/f1 is lower than the lower limit of the conditional expression (9), the refractive power of the first lens unit 1 is too strong. For this reason, it is difficult to correct spherical aberration on the longer focal length side and off-axial coma. On the contrary, when the value of fw/f1 exceeds the upper limit of the conditional expression (9), the length of the lens system increases, so that a compact zoom lens system is not realized.

In the conditional expression (10) regarding the refractive power of the second lens unit 2, when the value of fw/|f2| is lower than the lower limit of the conditional expression (10), the second lens unit 2 can be made compact. However, the Petzval sum of the entire system takes a large negative value, so that curvature of field cannot be corrected only by selecting a lens material. On the contrary, when the value of fw/|f2| exceeds the upper limit of the conditional expression (10), although aberration correction is easy, the length of the zooming system increases, so that the compactness the entire system cannot be achieved.

In the conditional expression (11) regarding the refractive power of the third lens unit 3, when the value of fw/f3 is lower than the lower limit of the conditional expression (11), the refractive power of the third lens unit 3 is too strong. For this reason, a back focal length for inserting crystal, etc. cannot be obtained. Further, it is difficult to correct spherical aberration. On the contrary, when the value of fw/f3 exceeds the upper limit of the conditional expression (11), the composite focal length of the first lens unit 1, the second lens unit 2 and the third lens unit 3 becomes a diverging system, so that the outer diameter of the fourth lens unit 4 increases. In addition, the Petzval sum of the entire system cannot be decreased.

In the conditional expression (12) regarding the refractive power of the fourth lens unit 4, when the value of fw/f4 is lower than the lower limit of the conditional expression (12), the coverage is decreased. In such a case, in order to obtain a desired coverage, it is necessary that the diameter of the first lens unit 1 be sufficiently great, so that the size and weight reduction cannot be realized. On the contrary, when the value of fw/f4 exceeds the upper limit of the condition (12), although aberration correction is easy, it is difficult to correct the imbalance in off-axial aberration between during photographing of a near object and during photographing of a far object.

In, from the object side, the lens element 3a having positive refractive power, the lens element 3b having positive refractive power and the lens element 3c having negative refractive power which constitute the third lens unit 3, the focal length f31 of the lens element 3a and the composite focal length f323 of the lens element 3b and the lens element 3c are set by the following conditional expression:

$$0.34 < f31/|f323| < 1.05 \tag{13}$$

In the conditional expression (13), when the value of f31/|f323| is lower than the lower limit of the condition (13), the diameter of the third lens unit 3 increases to secure a sufficient f-number. In addition, since the back focal length increases, a compact zoom lens system cannot be realized. On the contrary, when the value of f31/|f323| exceeds the upper limit of the conditional expression (13), a sufficient back focal length is not obtained although a sufficient f-number is secured.

When the local radius of curvature at an aperture 10% of the effective aperture of the object side aspherical surface of the lens element 3a of the third lens unit 3 is r311, the local radius of curvature at an aperture 90% of the effective aperture of the object side aspherical surface of the lens element 3a of the third lens unit 3 is r319, the local radius of curvature at an aperture 10% of the effective aperture of the image side aspherical surface of the lens element 3a of the third lens unit 3 is r321, the local radius of curvature at an aperture 90% of the effective aperture of the image side aspherical surface of the lens element 3a of the third lens unit 3 is r329, the radius of curvature at an aperture 10% of the effective aperture of the object side aspherical surface of the lens element 2b of the second lens unit 2 is r211, the local radius of curvature at an aperture 90% of the effective aperture of the object side aspherical surface of the lens element 2b of the second lens unit 2 is r219, and the object side surface of the lens element 4(sic) of the fourth lens unit is an aspherical surface, the local radius of curvature at an aperture 10% of the effective aperture of the lens element is r411 and the local radius of curvature at an aperture 90% of the effective aperture of the lens element is r419, or the image side surface of the lens element 4(sic) of the fourth lens unit is an aspherical surface, the local radius of curvature at an aperture 10% of the effective aperture of the lens element is r421 and the local radius of curvature at an aperture 90% of the effective aperture of the lens element is r429, conditional expressions which define the aspherical amount are the following conditional expressions:

$$0.412 < r311/r319 < 0.767 \tag{21}$$

$$0.193 < r321/r329 < 0.551 \tag{22}$$

$$1.059 < r211/r219 < 1.170 \tag{23}$$

and $$0.490 < r411/r419 < 0.787 \tag{24}$$

or $$0.915 < r421/r429 < 1.470 \tag{25}$$

By designing the lens elements so as to satisfy the above-mentioned conditional expressions, a sufficient aberration correcting capability is obtained which realizes a high resolution of the zoom lens system.

In the conditional expressions (21) and (22) regarding the aspherical surfaces of the lens element 3a of the third lens unit 3, when the values of r311/r319 and r321/r329 are lower than the lower limits of the conditional expressions (21) and (22), respectively, the correction amount of spherical aberration is too small. On the contrary, when the values of r311/r319 and r321/r329 exceed the upper limits of the conditional expressions (21) and (22), respectively, the correction amount of spherical aberration is too great, so that sufficient aberration performance is not obtained.

In the conditional expression (23) regarding the object side aspherical surface of the biconcave lens element 2b of the second lens unit 2, when the value of r211/r219 is outside the range between the lower and upper limits of the conditional expression (23), coma is greatly generated at the middle position between the wide-angle limit and the telephoto limit, and this causes flare.

In the conditional expression (24) regarding the object side aspherical surface of the lens element 4a of the fourth lens unit 4, when the value of r411/r419 is outside the range between the lower and upper limits of the condition (24), curvature of field and spherical aberration are greatly generated, so that sufficient capability is not obtained.

In the conditional expression (25) regarding the image plane 6 side aspherical surface of the lens element 4a of the fourth lens unit 4, when the value of r421/r429 is outside the range between the lower and upper limits of the conditional expression (25), curvature of field and spherical aberration are greatly generated, so that sufficient capability is not obtained.

<<First Numerical Example of the First Embodiment>>

A concrete numerical example of the above-mentioned first embodiment shown in FIG. 1 is shown in Table 1 below. In the first numerical example, the value of $(fw \times \tan\omega)/(f1 \times |f2|)^{1/2}$ is set at 0.2896. The value of $fw \times |p3c|$ is set at 0.708.

In Table 1, r represents the radius of curvature of the respective lens elements, d represents the thickness of the lens elements or the air spaces between the lens elements, n represents the refractive index of the respective lens elements to the d-line, and υ represents Abbe number of the respective lens elements to the d-line.

These definitions apply to Table 4, Table 7, Table 10, Table 13, Table 16, Table 19 and Table 22 similarly.

TABLE 1

| Lens | Surface | r | d | n | ν |
|---|---|---|---|---|---|
| 1a | S1 | 48.280 | | | |
|  |  |  | 0.90 | 1.50518 | 25.4 |
|  | S2 | 17.748 | | | |
| 1b |  |  | 4.53 | 1.60311 | 60.7 |
|  | S3 | −67.680 | | | |
|  |  |  | 0.20 | | |
|  | S4 | 14.615 | | | |
| 1c |  |  | 2.67 | 1.69680 | 55.5 |
|  | S5 | 42.483 | | | |
|  |  |  | Variable | | |
|  | S6 | 42.483 | | | |

TABLE 1-continued

| Lens | Surface | r | d | n | ν |
|------|---------|---|---|---|---|
| 2a | | | 0.60 | 1.77250 | 49.6 |
| | S7 | 4.482 | | | |
| | | | 2.15 | | |
| | S8 | −6.474 | | | |
| 2b | | | 0.80 | 1.66547 | 55.2 |
| | S9 | 5.874 | | | |
| 2c | | | 1.80 | 1.80518 | 25.4 |
| | S10 | −323.142 | | | |
| | | | Variable | | |
| | S11 | 7.889 | | | |
| | | | 4.55 | 1.66547 | 55.2 |
| 3a | S12 | −14.939 | | | |
| | | | 0.10 | | |
| | S13 | 9.748 | | | |
| 3b | | | 2.40 | 1.51633 | 64.1 |
| | S14 | −104.180 | | | |
| 3c | | | 0.60 | 1.84666 | 23.9 |
| | S15 | 5.767 | | | |
| | | | Variable | | |
| | S16 | 7.481 | | | |
| 4a | | | 2.87 | 1.51450 | 63.1 |
| | S17 | −31.976 | | | |
| | | | Variable | | |
| | S18 | ∞ | | | |
| 5 | | | 4.30 | 1.51633 | 64.1 |
| | S19 | ∞ | | | |

The aspherical configuration is defined by the following expression (26):

$$Z = \frac{C \times Y^2}{1 + (1 - (1+K) \times C^2 \times Y^2)^{1/2}} + D \times Y^4 + E \times Y^4 + F \times Y^8 \quad (26)$$

Here, Z is the distance from the vertex of the aspherical surface to a point on the aspherical surface at a height Y from the optical axis, Y is the height from the optical axis, C is the curvature (=1/r) of the vertex of the aspherical surface, K is a conic constant, and D, E and F are aspherical coefficients.

The lens surfaces with the surface numbers S8, S11, S12 and S16 are aspherical and their aspherical coefficients are shown in Table 2 below.

TABLE 2

| | Surface | | | |
|---|---|---|---|---|
| | S8 | S11 | S12 | S16 |
| K | −1.30349 | −7.99910 × 10⁻¹ | −6.26902 | −1.99544 × 10⁻² |
| D | −6.01825 × 10⁻⁴ | −1.39502 × 10⁻⁴ | −4.75872 × 10⁻⁶ | −2.07422 × 10⁻⁴ |
| E | −2.10812 × 10⁻⁵ | 2.02487 × 10⁻⁷ | 1.65237 × 10⁻⁷ | −6.99987 × 10⁻⁶ |
| F | 0.0 | 0.0 | 0.0 | 0.0 |

As an example of the air space which is variable during zooming, values at an object point of 2 m are shown in Table 3 below. In this table, the standard position is a zoom position whereat the magnification borne by the second lens unit 2 is 1. In the table, f, F/NO and ω represent the focal lengths, f-numbers and incident half view angles at the wide-angle limit, the standard position and the telephoto limit, respectively. Moreover, di (i=5, 10, 15, 17) represents the air spaces between the lens elements at the wide-angle limit, the standard position and the telephoto limit.

These definitions apply to Table 6, Table 9, Table 12, Table 15, Table 18, Table 21 and Table 24 similarly.

TABLE 3

| | Wide-angle limit | Standard position | Telephoto limit |
|---|---|---|---|
| f | 4.825 | 22.851 | 44.488 |
| F/NO | 1.46 | 2.25 | 2.67 |
| 2ω (°) | 59.90 | 12.73 | 6.61 |
| d5 | 0.700 | 9.806 | 12.450 |
| d10 | 13.383 | 4.277 | 1.633 |
| d15 | 6.099 | 1.666 | 5.050 |
| d17 | 1.014 | 5.497 | 2.063 |

Concrete values for the conditional expressions (3) to (6) and (13) to (17) in the first numerical example of the embodiment of the invention are shown below.

| | |
|---|---|
| $fw/f1=0.222$ | Conditional expression (3) |
| $fw/|f2|=1.136$ | Conditional expression (4) |
| $fw/f3=0.436$ | Conditional expression (5) |
| $fw/f4=0.399$ | Conditional expression (6) |
| $|f31/f323|=0.692$ | Conditional expression (13) |
| $r311/r319=0.518$ | Conditional expression (14) |
| $r321/r329=0.437$ | Conditional expression (15) |
| $r211/r219=1.077$ | Conditional expression (16) |
| $r411/r419=0.690$ | Conditional expression (17) |

<<Second Numerical Example of the First Embodiment>>

A second concrete numerical example of the first embodiment is shown in Table 4 below. In the second numerical example, the value of $(fw \times \tan\omega)/(f1 \times |f2|)^{1/2}$ is set at 0.290. The value of $fw \times |p3c|$ is set at 0.643.

TABLE 4

| Lens | Surface | r | d | n | ν |
|------|---------|---|---|---|---|
| | S1 | 48.297 | | | |
| | S1 | 48.297 | | | |
| 1a | | | 0.90 | 1.50518 | 25.4 |
| | S2 | 17.773 | | | |
| 1b | | | 4.53 | 1.60311 | 60.7 |
| | S3 | −67.810 | | | |
| | | | 0.20 | | |
| | S4 | 14.614 | | | |
| 1c | | | 2.67 | 1.69680 | 55.5 |
| | S5 | 42.510 | | | |
| | | | Variable | | |
| | S6 | 42.510 | | | |
| 2a | | | 0.60 | 1.77250 | 49.6 |
| | S7 | 4.872 | | | |
| | | | 2.15 | | |
| | S8 | −6.344 | | | |
| 2b | | | 0.80 | 1.66547 | 55.2 |
| | S9 | 6.163 | | | |
| 2c | | | 1.80 | 1.80518 | 25.4 |
| | S10 | −187.168 | | | |
| | | | Variable | | |
| | S11 | 7.284 | | | |
| | | | 4.60 | 1.66547 | 55.2 |
| 3a | S12 | −10.816 | | | |
| | | | 0.10 | | |
| | S13 | 26.909 | | | |
| 3b | | | 2.40 | 1.51633 | 64.1 |
| | S14 | −60.749 | | | |
| 3c | | | 0.60 | 1.84666 | 23.9 |
| | S15 | 6.450 | | | |
| | | | Variable | | |

TABLE 4-continued

| Lens | Surface | r | d | n | ν |
|---|---|---|---|---|---|
| 4a | S16 | 7.829 | | | |
| | | | 2.85 | 1.51450 | 63.1 |
| | S17 | −28.035 | | | |
| | | | Variable | | |
| | S18 | ∞ | | | |
| 5 | | | 4.30 | 1.51633 | 64.1 |
| | S19 | ∞ | | | |

The aspherical configuration is defined by the above-described expression (26).

The lens surfaces with the surface numbers S8, S11, S12, and S16 are aspherical and their aspherical coefficients are shown in Table 5 below.

TABLE 5

| | Surface | | | |
|---|---|---|---|---|
| | S8 | S11 | S12 | S16 |
| K | −1.59927 | −6.64273 × $10^{-1}$ | −5.49224 | 2.83550 × $10^{-1}$ |
| D | −7.38884 × $10^{-4}$ | −2.13723 × $10^{-4}$ | 2.18903 × $10^{-5}$ | −1.89844 × $10^{-4}$ |
| E | −2.01243 × $10^{-5}$ | −1.52307 × $10^{-7}$ | −1.59533 × $10^{-8}$ | −1.24516 × $10^{-5}$ |
| F | 0.0 | 0.0 | 0.0 | 0.0 |

As an example of the air space which is variable during zooming, values at an object point of 2 m are shown in Table 6 below. In this table, the standard position is a zoom position whereat the magnification borne by the second lens unit 2 is 1.

TABLE 6

| | Wide-angle limit | Standard position | Telephoto limit |
|---|---|---|---|
| f | 4.900 | 23.287 | 45.100 |
| F/NO | 1.48 | 2.30 | 2.71 |
| 2ω (°) | 59.13 | 12.49 | 6.52 |
| d5 | 0.700 | 9.807 | 12.450 |
| d10 | 13.383 | 4.276 | 1.633 |
| d15 | 6.099 | 1.468 | 4.958 |
| d17 | 1.000 | 5.631 | 2.141 |

Concrete values for the conditional expressions (3) to (6) and (13) to (17) in the second numerical example are shown below.

| | |
|---|---|
| $fw/f1=0.226$ | Conditional expression (3) |
| $fw/|f2|=1.155$ | Conditional expression (4) |
| $fw/f3=0.442$ | Conditional expression (5) |
| $fw/f4=0.401$ | Conditional expression (6) |
| $f31/|f323|=0.821$ | Conditional expression (13) |
| $r311/r319=0.412$ | Conditional expression (14) |
| $r321/r329=0.193$ | Conditional expression (15) |
| $r211/r219=1.059$ | Conditional expression (16) |
| $r411/r419=0.490$ | Conditional expression (17) |

<<Third Numerical Example of the First Embodiment>>

A third concrete numerical example of the first embodiment is shown in Table 7 below. In the third numerical example, the value of $(fw \times \tan\omega)/(f1 \times |f2|)^{1/2}$ is set at 0.289. The value of $fw \times |p3c|$ is set at 0.799.

TABLE 7

| Lens | Surface | r | d | n | ν |
|---|---|---|---|---|---|
| 1a | S1 | 48.011 | | | |
| | | | 0.90 | 1.50518 | 25.4 |
| | S2 | 17.638 | | | |
| 1b | | | 4.53 | 1.60311 | 60.7 |
| | S3 | −68.747 | | | |
| | | | 0.20 | | |
| 1c | S4 | 14.582 | | | |
| | | | 2.67 | 1.69680 | 55.5 |
| | S5 | 42.499 | | | |
| | | | Variable | | |
| 2a | S6 | 42.499 | | | |
| | | | 0.60 | 1.77250 | 49.6 |
| | S7 | 4.807 | | | |
| | | | 2.15 | | |
| 2b | S8 | −6.623 | | | |
| | | | 0.80 | 1.66547 | 55.2 |
| 2c | S9 | 5.464 | | | |
| | | | 1.80 | 1.80518 | 25.4 |
| | S10 | ∞ | | | |
| | | | Variable | | |
| | S11 | 10.798 | | | |
| | | | 3.70 | 1.66547 | 55.2 |
| 3a | S12 | −17.447 | | | |
| | | | 0.11 | | |
| | S13 | 6.048 | | | |
| 3b | | | 3.00 | 1.51633 | 64.1 |
| | S14 | 246.866 | | | |
| 3c | | | 0.60 | 1.84666 | 23.9 |
| | S15 | 5.113 | | | |
| | | | Variable | | |
| | S16 | 7.340 | | | |
| 4a | | | 2.87 | 1.51450 | 63.1 |
| | S17 | −35.699 | | | |
| | | | Variable | | |
| | S18 | ∞ | | | |
| 5 | | | 4.30 | 1.51633 | 64.1 |
| | S19 | ∞ | | | |

The aspherical configuration is defined by the above-described expression (26).

The lens surfaces with the surface numbers S8, S11, S12 and S16 are aspherical and their aspherical coefficients are shown in Table 8 below.

TABLE 8

| | Surface | | | |
|---|---|---|---|---|
| | S8 | S11 | S12 | S16 |
| K | −7.86417 × $10^{-1}$ | −1.03290 | −4.36782 × $10^{-1}$ | 1.68183 × $10^{-1}$ |
| D | −3.84920 × $10^{-4}$ | −3.58814 × $10^{-5}$ | 9.82512 × $10^{-5}$ | −3.87598 × $10^{-4}$ |
| E | −2.72545 × $10^{-5}$ | 7.19110 × $10^{-7}$ | 1.50306 × $10^{-7}$ | −6.13115 × $10^{-6}$ |
| F | 0.0 | 0.0 | 0.0 | 0.0 |

As an example of the air space which is variable during zooming, values at an object point of 2 m are shown in Table 9 below. In this table, the standard position is a zoom position whereat the magnification borne by the second lens unit 2 is 1.

TABLE 9

|  | Wide-angle limit | Standard position | Telephoto limit |
|---|---|---|---|
| f | 4.825 | 23.088 | 44.488 |
| F/NO | 1.46 | 2.28 | 2.67 |
| 2ω (°) | 59.83 | 12.64 | 6.58 |
| d5 | 0.700 | 9.806 | 12.450 |
| d10 | 13.383 | 3.677 | 1.633 |
| d15 | 6.099 | 1.666 | 5.050 |
| d17 | 1.014 | 5.497 | 2.063 |

Concrete values for the conditional expressions (3) to (6) and (13) to (17) in the third numerical example are shown below.

| $fw/f1=0.222$ | Conditional expression (3) |
| $fw/|f2|=1.136$ | Conditional expression (4) |
| $fw/f3=0.438$ | Conditional expression (5) |
| $fw/f4=0.398$ | Conditional expression (6) |
| $f31/|f323|=0.492$ | Conditional expression (13) |
| $r311/r319=0.767$ | Conditional expression (14) |
| $r321/r329=0.206$ | Conditional expression (15) |
| $r211/r219=1.130$ | Conditional expression (16) |
| $r411/r419=0.687$ | Conditional expression (17) |

<<Fourth Numerical Example of the First Embodiment>>

A fourth concrete numerical example of the first embodiment is shown in Table 10 below. In the fourth numerical example, the value of $(fw \times \tan\omega)/(f1 \times |f2|)^{1/2}$ is set at 0.289. The value of $fw \times |p3c|$ is set at 0.754.

TABLE 10

| Lens | Surface | r | d | n | ν |
|---|---|---|---|---|---|
| 1a | S1 | 48.011 | | | |
|  |  |  | 0.90 | 1.50518 | 25.4 |
|  | S2 | 17.638 | | | |
| 1b |  |  | 4.53 | 1.60311 | 60.7 |
|  | S3 | −68.747 | | | |
|  |  |  | 0.20 | | |
|  | S4 | 14.582 | | | |
| 1c |  |  | 2.67 | 1.69680 | 55.5 |
|  | S5 | 42.499 | | | |
|  |  |  | Variable | | |
|  | S6 | 42.499 | | | |
| 2a |  |  | 0.60 | 1.77250 | 49.6 |
|  | S7 | 4.807 | | | |
|  |  |  | 2.15 | | |
|  | S8 | −6.623 | | | |
| 2b |  |  | 0.80 | 1.66547 | 55.2 |
|  | S9 | 5.464 | | | |
| 2c |  |  | 1.80 | 1.80518 | 25.4 |
|  | S10 | ∞ | | | |
|  |  |  | Variable | | |
|  | S11 | 9.901 | | | |
|  |  |  | 3.80 | 1.66547 | 55.2 |
| 3a | S12 | −17.801 | | | |
|  |  |  | 0.10 | | |
|  | S13 | 6.827 | | | |
| 3b |  |  | 3.00 | 1.51633 | 64.1 |
|  | S14 | 235.691 | | | |
| 3c |  |  | 0.60 | 1.84666 | 23.9 |
|  | S15 | 5.416 | | | |
|  |  |  | Variable | | |
|  | S16 | 7.340 | | | |

TABLE 10-continued

| Lens | Surface | r | d | n | ν |
|---|---|---|---|---|---|
| 4a |  |  | 0.60 | 1.51450 | 63.1 |
|  | S17 | −35.699 | | | |
|  |  |  | Variable | | |
|  | S18 | ∞ | | | |
| 5 |  |  | 4.30 | 1.51633 | 64.1 |
|  | S19 | ∞ | | | |

The aspherical configuration is defined by the above-described expression (26).

The lens surfaces with the surface numbers S8, S11, S12 and S16 are aspherical and their aspherical coefficients are shown in Table 11 below.

TABLE 11

|  | Surface | | | |
|---|---|---|---|---|
|  | S8 | S11 | S12 | S16 |
| K | $-7.86417 \times 10^{-1}$ | $-9.88732 \times 10^{-1}$ | $-4.36782 \times 10^{-1}$ | $1.68183 \times 10^{-1}$ |
| D | $-3.84920 \times 10^{-4}$ | $-3.17578 \times 10^{-5}$ | $1.18295 \times 10^{-4}$ | $-3.87598 \times 10^{-4}$ |
| E | $-2.72545 \times 10^{-5}$ | $5.20658 \times 10^{-7}$ | $3.10261 \times 10^{-8}$ | $-6.13115 \times 10^{-6}$ |
| F | 0.0 | 0.0 | 0.0 | 0.0 |

As an example of the air space which is variable during zooming, values at an object point of 2 m are shown in Table 12 below. In this table, the standard position is a zoom position whereat the magnification borne by the second lens unit 2 is 1.

TABLE 12

|  | Wide-angle limit | Standard position | Telephoto limit |
|---|---|---|---|
| f | 4.825 | 23.013 | 44.486 |
| F/NO | 1.46 | 2.27 | 2.67 |
| 2ω (°) | 59.73 | 12.67 | 6.58 |
| d5 | 0.700 | 9.806 | 12.450 |
| d10 | 13.383 | 4.277 | 1.633 |
| d15 | 6.099 | 1.666 | 5.050 |
| d17 | 1.014 | 5.497 | 2.063 |

Concrete values for the conditional expressions (3) to (6) and (13) to (17) in the fourth numerical example are shown below.

| $fw/f1=0.222$ | Conditional expression (3) |
| $fw/|f2|=1.136$ | Conditional expression (4) |
| $fw/f3=0.438$ | Conditional expression (5) |
| $fw/f4=0.398$ | Conditional expression (6) |
| $f31/|f323|=0.528$ | Conditional expression (13) |
| $r311/r319=0.718$ | Conditional expression (14) |
| $r321/r329=0.277$ | Conditional expression (15) |
| $r211/r219=1.170$ | Conditional expression (16) |
| $r411/r419=0.687$ | Conditional expression (17) |

<<Fifth Numerical Example of the First Embodiment>>

A fifth concrete numerical example of the first embodiment is shown in Table 13 below. In the fifth numerical example, the value of $(fw \times \tan\omega)/(f1 \times |f2|)^{1/2}$ is set at 0.255. The value of $fw \times |p3c|$ is set at 0.729.

TABLE 13

| Lens | Surface | r | d | n | ν |
|---|---|---|---|---|---|
| 1a | S1 | 50.914 | 0.90 | 1.50518 | 25.4 |
| | S2 | 18.815 | | | |
| 1b | | | 4.38 | 1.60311 | 60.7 |
| | S3 | −62.375 | | | |
| | | | 0.20 | | |
| | S4 | 14.300 | | | |
| 1c | | | 2.50 | 1.69680 | 55.5 |
| | S5 | 33.778 | | | |
| | | | Variable | | |
| | S6 | 33.778 | | | |
| 2a | | | 0.60 | 1.77250 | 49.6 |
| | S7 | 4.871 | | | |
| | | | 2.38 | | |
| | S8 | −6.100 | | | |
| 2b | | | 0.80 | 1.66547 | 55.2 |
| | S9 | 7.007 | | | |
| 2c | | | 1.68 | 1.80518 | 25.4 |
| | S10 | −53.117 | | | |
| | | | Variable | | |
| | S11 | 9.271 | | | |
| | | | 4.26 | 1.66547 | 55.2 |
| 3a | S12 | −17.003 | | | |
| | | | 0.10 | | |
| | S13 | 7.638 | | | |
| 3b | | | 2.81 | 1.51633 | 64.1 |
| | S14 | −171.455 | | | |
| 3c | | | 0.60 | 1.84666 | 23.9 |
| | S15 | 5.623 | | | |
| | | | Variable | | |
| | S16 | 7.940 | | | |
| 4a | | | 2.65 | 1.51450 | 63.1 |
| | S17 | −35.233 | | | |
| | | | Variable | | |
| | S18 | ∞ | | | |
| 5 | | | 4.30 | 1.51633 | 64.1 |
| | S19 | ∞ | | | |

The aspherical configuration is defined by the above-described expression (26).

The lens surfaces with the surface numbers S8, S11, S12 and S16 are aspherical and their aspherical coefficients are shown in Table 14 below.

TABLE 14

| | Surface | | | |
|---|---|---|---|---|
| | S8 | S11 | S12 | S16 |
| K | 1.19086 | $-6.52397 \times 10^{-1}$ | $-7.30379$ | $3.06179 \times 10^{-1}$ |
| D | $6.76360 \times 10^{-4}$ | $-9.97655 \times 10^{-5}$ | $-2.08333 \times 10^{-5}$ | $-2.43589 \times 10^{-4}$ |
| E | $3.84156 \times 10^{-5}$ | $-3.13284 \times 10^{-7}$ | $-3.28248 \times 10^{-8}$ | $-9.73397 \times 10^{-6}$ |
| F | $-3.58630 \times 10^{-7}$ | 0.0 | 0.0 | $1.33719 \times 10^{-7}$ |

As an example of the air space which is variable during zooming, values at an object point of 2 m are shown in Table 15 below. In this table, the standard position is a zoom position whereat the magnification borne by the second lens unit 2 is 1.

TABLE 15

| | Wide-angle limit | Standard position | Telephoto limit |
|---|---|---|---|
| f | 4.841 | 23.311 | 45.005 |
| F/NO | 1.46 | 2.27 | 2.72 |
| 2ω (°) | 59.82 | 12.52 | 6.52 |
| d5 | 0.700 | 10.440 | 13.218 |
| d10 | 14.010 | 4.270 | 1.492 |
| d15 | 6.063 | 1.423 | 4.824 |
| d17 | 1.015 | 5.655 | 2.254 |

Concrete values for the conditional expressions (3) to (6) and (13) to (17) in the fifth numerical example are shown below.

$fw/f1 = 0.213$   Conditional expression (3)

$fw/|f2| = 1.082$   Conditional expression (4)

$fw/f3 = 0.434$   Conditional expression (5)

$fw/f4 = 0.376$   Conditional expression (6)

$f31/|f323| = 0.764$   Conditional expression (13)

$r311/r319 = 0.491$   Conditional expression (14)

$r321/r329 = 0.551$   Conditional expression (15)

$r211/r219 = 1.080$   Conditional expression (16)

$r411/r419 = 0.787$   Conditional expression (17)

<<Sixth Numerical Example of the First Embodiment>>

A sixth concrete numerical example of the first embodiment is shown in Table 16 below. In the sixth numerical example, the value of $(fw \times \tan\omega)/(f1 \times |f2|)^{1/2}$ is set at 0.301. The value of $fw \times |p3c|$ is set at 0.671.

TABLE 16

| Lens | Surface | r | d | n | ν |
|---|---|---|---|---|---|
| 1a | S1 | 40.774 | 0.90 | 1.50518 | 25.4 |
| | S2 | 16.433 | | | |
| 1b | | | 4.51 | 1.60311 | 60.7 |
| | S3 | −87.094 | | | |
| | | | 0.20 | | |
| | S4 | 14.613 | | | |
| 1c | | | 2.72 | 1.69680 | 55.5 |
| | S5 | 51.625 | | | |
| | | | Variable | | |
| | S6 | 32.716 | | | |
| 2a | | | 0.65 | 1.77250 | 49.6 |
| | S7 | 4.548 | | | |
| | | | 2.13 | | |
| | S8 | −5.797 | | | |
| 2b | | | 0.80 | 1.66547 | 55.2 |
| | S9 | 5.960 | | | |
| 2c | | | 1.74 | 1.80518 | 25.4 |
| | S10 | −111.219 | | | |
| | | | Variable | | |
| | S11 | 7.650 | | | |
| | | | 4.75 | 1.66547 | 55.2 |
| 3a | S12 | −12.559 | | | |
| | | | 0.10 | | |
| | S13 | 13.505 | | | |
| 3b | | | 2.63 | 1.51633 | 64.1 |
| | S14 | −42.751 | | | |
| 3c | | | 0.60 | 1.84666 | 23.9 |
| | S15 | 6.616 | | | |
| | | | Variable | | |
| | S16 | 7.791 | | | |

TABLE 16-continued

| Lens | Surface | r | d | n | ν |
|---|---|---|---|---|---|
| 4a | | | 0.60 | 1.51450 | 63.1 |
| | S17 | −27.282 | | | |
| | | | Variable | | |
| | S18 | ∞ | | | |
| 5 | | | 4.30 | 1.51633 | 64.1 |
| | S19 | ∞ | | | |

The aspherical configuration is defined by the above-described expression (26).

The lens surfaces with the surface numbers S8, S11, S12 and S16 are aspherical and their aspherical coefficients are shown in Table 17 below.

TABLE 17

| | Surface | | | |
|---|---|---|---|---|
| | S8 | S11 | S12 | S16 |
| K | −1.08836 | −7.19076 × 10⁻¹ | −6.66558 × 10⁻¹ | 2.88131 × 10⁻¹ |
| D | −6.47949 × 10⁻⁴ | −1.76611 × 10⁻⁴ | −3.12888 × 10⁻⁵ | −1.97219 × 10⁻⁴ |
| E | −1.42550 × 10⁻⁵ | −2.86321 × 10⁻⁷ | 4.91724 × 10⁻⁷ | −1.38847 × 10⁻⁵ |
| F | −2.07217 × 10⁻⁶ | 4.77300 × 10⁻⁹ | −1.97368 × 10⁻⁹ | 1.03917 × 10⁻⁷ |

As an example of the air space which is variable during zooming, values at an object point of 2 m are shown in Table 18 below. In this table, the standard position is a zoom position whereat the magnification borne by the second lens unit 2 is 1.

TABLE 18

| | Wide-angle limit | Standard position | Telephoto limit |
|---|---|---|---|
| f | 4.859 | 22.903 | 45.123 |
| F/NO | 1.47 | 2.28 | 2.70 |
| 2ω (°) | 59.31 | 12.64 | 6.52 |
| d5 | 0.700 | 9.436 | 11.953 |
| d10 | 13.260 | 4.524 | 2.007 |
| d15 | 6.179 | 1.501 | 4.998 |
| d17 | 1.014 | 5.691 | 2.194 |

Concrete values for the conditional expressions (3) to (6) and (13) to (17) in the sixth numerical example are shown below.

$fw/f1 = 0.232$    Conditional expression (3)

$fw/|f2| = 1.205$    Conditional expression (4)

$fw/f3 = 0.453$    Conditional expression (5)

$fw/f4 = 0.401$    Conditional expression (6)

$f31/|f323| = 0.764$    Conditional expression (13)

$r311/r319 = 0.470$    Conditional expression (14)

$r321/r329 = 0.278$    Conditional expression (15)

$r211/r219 = 1.084$    Conditional expression (16)

$r411/r419 = 0.688$    Conditional expression (17)

<<Seventh Numerical Example of the First Embodiment>>

A seventh concrete numerical example of the first embodiment is shown in Table 19 below. In the seventh numerical example, the value of $(fw \times \tan\omega)/(f1 \times |f2|)^{1/2}$ is set at 0.302. The value of $fw \times |p3c|$ is set at 0.688.

TABLE 19

| Lens | Surface | r | d | n | ν |
|---|---|---|---|---|---|
| 1a | S1 | 42.522 | | | |
| | | | 0.90 | 1.50518 | 25.4 |
| | S2 | 16.588 | | | |
| 1b | | | 4.60 | 1.60311 | 60.7 |
| | S3 | −78.767 | | | |
| | | | 0.20 | | |
| | S4 | 14.517 | | | |
| 1c | | | 2.75 | 1.69680 | 55.5 |
| | S5 | 49.892 | | | |
| | | | Variable | | |
| | S6 | 49.892 | | | |
| 2a | | | 0.65 | 1.77250 | 49.6 |
| | S7 | 4.737 | | | |
| | | | 2.11 | | |
| | S8 | −96.414 | | | |
| 2b | | | 0.80 | 1.66547 | 55.2 |
| | S9 | 5.559 | | | |
| 2c | | | 2.00 | 1.80518 | 25.4 |
| | S10 | −684.342 | | | |
| | | | Variable | | |
| | S11 | 8.051 | | | |
| | | | 4.75 | 1.66547 | 55.2 |
| 3a | S12 | −14.512 | | | |
| | | | 0.10 | | |
| | S13 | 10.321 | | | |
| 3b | | | 2.65 | 1.51633 | 64.1 |
| | S14 | −59.609 | | | |
| 3c | | | 0.65 | 1.84666 | 23.9 |
| | S15 | 5.982 | | | |
| | | | Variable | | |
| | S16 | 7.542 | | | |
| 4a | | | 2.75 | 1.51450 | 63.1 |
| | S17 | −33.034 | | | |
| | | | Variable | | |
| | S18 | ∞ | | | |
| 5 | | | 4.0 | 1.51633 | 64.1 |
| | S19 | ∞ | | | |

The aspherical configuration is defined by the above-described expression (26).

The lens surfaces with the surface numbers S8, S11, S12 and S16 are aspherical and their aspherical coefficients are shown in Table 20 below.

TABLE 20

| | Surface | | | |
|---|---|---|---|---|
| | S8 | S11 | S12 | S16 |
| K | −2.32385 × 10⁻¹ | −8.67603 × 10⁻¹ | −6.96549 | 2.51517 × 10⁻¹ |
| D | −9.56378 × 10⁻⁵ | −1.37144 × 10⁻⁴ | −5.22471 × 10⁻⁵ | −2.57487 × 10⁻⁴ |
| E | −2.33087 × 10⁻⁵ | 2.13051 × 10⁻⁷ | 4.87115 × 10⁻⁷ | −1.08193 × 10⁻⁵ |
| F | 0.0 | 0.0 | 0.0 | 0.0 |

As an example of the air space which is variable during zooming, values at an object point of 2 m are shown in Table 21 below. In this table, the standard position is a zoom position whereat the magnification borne by the second lens unit 2 is 1.

TABLE 21

|  | Wide-angle limit | Standard position | Telephoto limit |
|---|---|---|---|
| f | 4.862 | 22.814 | 45.113 |
| F/NO | 1.52 | 2.30 | 2.80 |
| 2ω (°) | 59.53 | 12.80 | 6.54 |
| d5 | 0.700 | 9.440 | 11.954 |
| d10 | 13.260 | 4.520 | 1.006 |
| d15 | 6.380 | 1.719 | 5.192 |
| d17 | 1.015 | 5.976 | 2.202 |

Concrete values for the conditional expressions (3) to (6) and (13) to (17) in the seventh numerical example are shown below.

| | |
|---|---|
| $fw/f1=0.232$ | Conditional expression (3) |
| $fw/|f2|=1.205$ | Conditional expression (4) |
| $fw/f3=0.448$ | Conditional expression (5) |
| $fw/f4=0.398$ | Conditional expression (6) |
| $f31/|f323|=0.696$ | Conditional expression (13) |
| $r311/r319=0.504$ | Conditional expression (14) |
| $r321/r329=0.434$ | Conditional expression (15) |
| $r211/r219=1.128$ | Conditional expression (16) |
| $r411/r419=0.676$ | Conditional expression (17) |

<<Eighth Numerical Example of the First Embodiment>>

An eighth concrete numerical example of the first embodiment is shown in Table 22 below. In the eighth numerical example, the value of $(fw \times \tan\omega)/(f1 \times |f2|)^{1/2}$ is set at 0.290. The value of $fw \times |p3c|$ is set at 0.708.

TABLE 22

| Lens | Surface | r | d | n | υ |
|---|---|---|---|---|---|
| 1a | S1 | 48.280 | | | |
| | | | 0.90 | 1.50518 | 25.4 |
| | S2 | 17.748 | | | |
| 1b | | | 4.53 | 1.60311 | 60.7 |
| | S3 | −67.680 | | | |
| | | | 0.20 | | |
| | S4 | 14.615 | | | |
| 1c | | | 2.67 | 1.69680 | 55.5 |
| | S5 | 42.483 | | | |
| | | | Variable | | |
| | S6 | 42.483 | | | |
| 2a | | | 0.60 | 1.77250 | 49.6 |
| | S7 | 4.842 | | | |
| | | | 2.15 | | |
| | S8 | −6.474 | | | |
| 2b | | | 0.80 | 1.66547 | 55.2 |
| | S9 | 5.874 | | | |
| 2c | | | 1.80 | 1.80518 | 25.4 |
| | S10 | −14.880 | | | |
| | | | Variable | | |
| | S11 | 7.906 | | | |
| 3a | | | 4.55 | 1.66547 | 55.2 |
| | S12 | −14.880 | | | |
| | | | 0.10 | | |
| | S13 | 9.753 | | | |
| 3b | | | 2.40 | 1.51633 | 64.1 |
| | S14 | −104.180 | | | |
| 3c | | | 0.60 | 1.84666 | 23.9 |
| | S15 | 7.767 | | | |
| | | | Variable | | |
| | S16 | 7.487 | | | |

TABLE 22-continued

| Lens | Surface | r | d | n | υ |
|---|---|---|---|---|---|
| 4a | | | 2.87 | 1.51450 | 63.1 |
| | S17 | −32.099 | | | |
| | | | Variable | | |
| | S18 | ∞ | | | |
| 5 | | | 4.30 | 1.51633 | 64.1 |
| | S19 | ∞ | | | |

The aspherical configuration is defined by the above-described expression (26).

The lens surfaces with the surface numbers S8, S11, S12 and S17 are aspherical and their aspherical coefficients are shown in Table 23 below.

TABLE 23

| | Surface | | | |
|---|---|---|---|---|
| | S8 | S11 | S12 | S17 |
| K | −1.30349 | $-7.88646 \times 10^{-1}$ | −6.28638 | $-3.39558 \times 10^{-2}$ |
| D | $-6.01825 \times 10^{-4}$ | $-1.39605 \times 10^{-4}$ | $3.77147 \times 10^{-6}$ | $3.36145 \times 10^{-4}$ |
| E | $-2.10812 \times 10^{-5}$ | $2.67960 \times 10^{-7}$ | $1.19995 \times 10^{-7}$ | $3.53837 \times 10^{-6}$ |
| F | 0.0 | 0.0 | 0.0 | 0.0 |

As an example of the air space which is variable during zooming, values at an object point of 2 m are shown in Table 24 below. In this table, the standard position is a zoom position whereat the magnification borne by the second lens unit 2 is 1.

TABLE 24

|  | Wide-angle limit | Standard position | Telephoto limit |
|---|---|---|---|
| f | 4.825 | 22.851 | 44.488 |
| F/NO | 1.46 | 2.25 | 2.67 |
| 2ω (°) | 59.96 | 12.62 | 6.59 |
| d5 | 0.700 | 9.806 | 12.450 |
| d10 | 12.783 | 3.677 | 1.033 |
| d15 | 6.099 | 1.666 | 5.050 |
| d17 | 1.014 | 5.497 | 2.063 |

Concrete values for the conditional expressions (3) to (6), (13) to (16) and (18) in the eighth numerical example are shown below.

| | |
|---|---|
| $fw/f1=0.222$ | Conditional expression (3) |
| $fw/|f2|=1.136$ | Conditional expression (4) |
| $fw/f3=0.436$ | Conditional expression (5) |
| $fw/f4=0.399$ | Conditional expression (6) |
| $f31/|f323|=0.691$ | Conditional expression (13) |
| $r311/r319=0.529$ | Conditional expression (14) |
| $r321/r329=0.413$ | Conditional expression (15) |
| $r211/r219=1.078$ | Conditional expression (16) |
| $r421/r429=1.078$ | Conditional expression (18) |

<<Aberration Performance of the Numerical Examples of the First Embodiment>>

Figure 3:
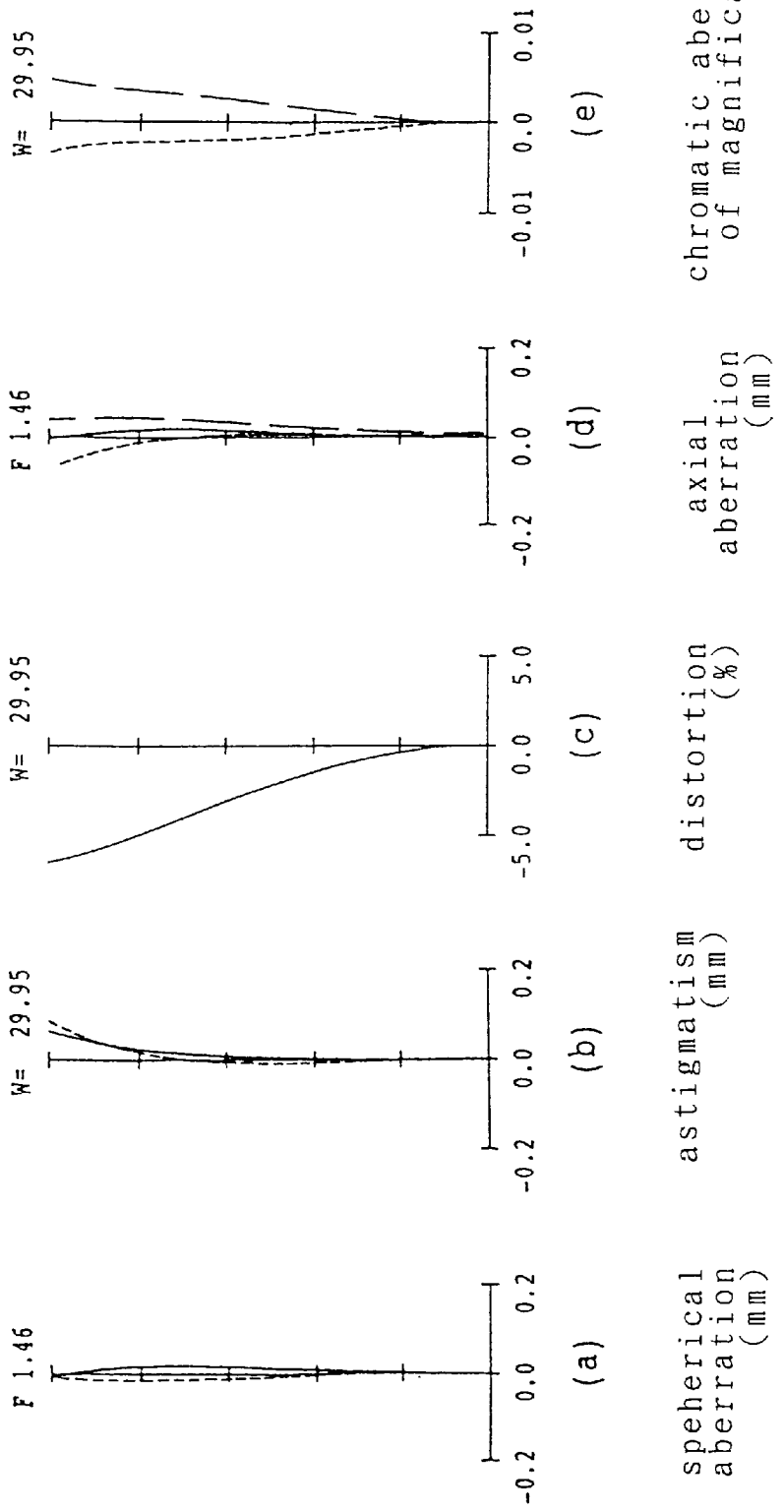
FIG. 3 is a view showing aberration capability at a wide-angle limit of a zoom lens system according to a first concrete numerical example of the first embodiment.
Figure 4:
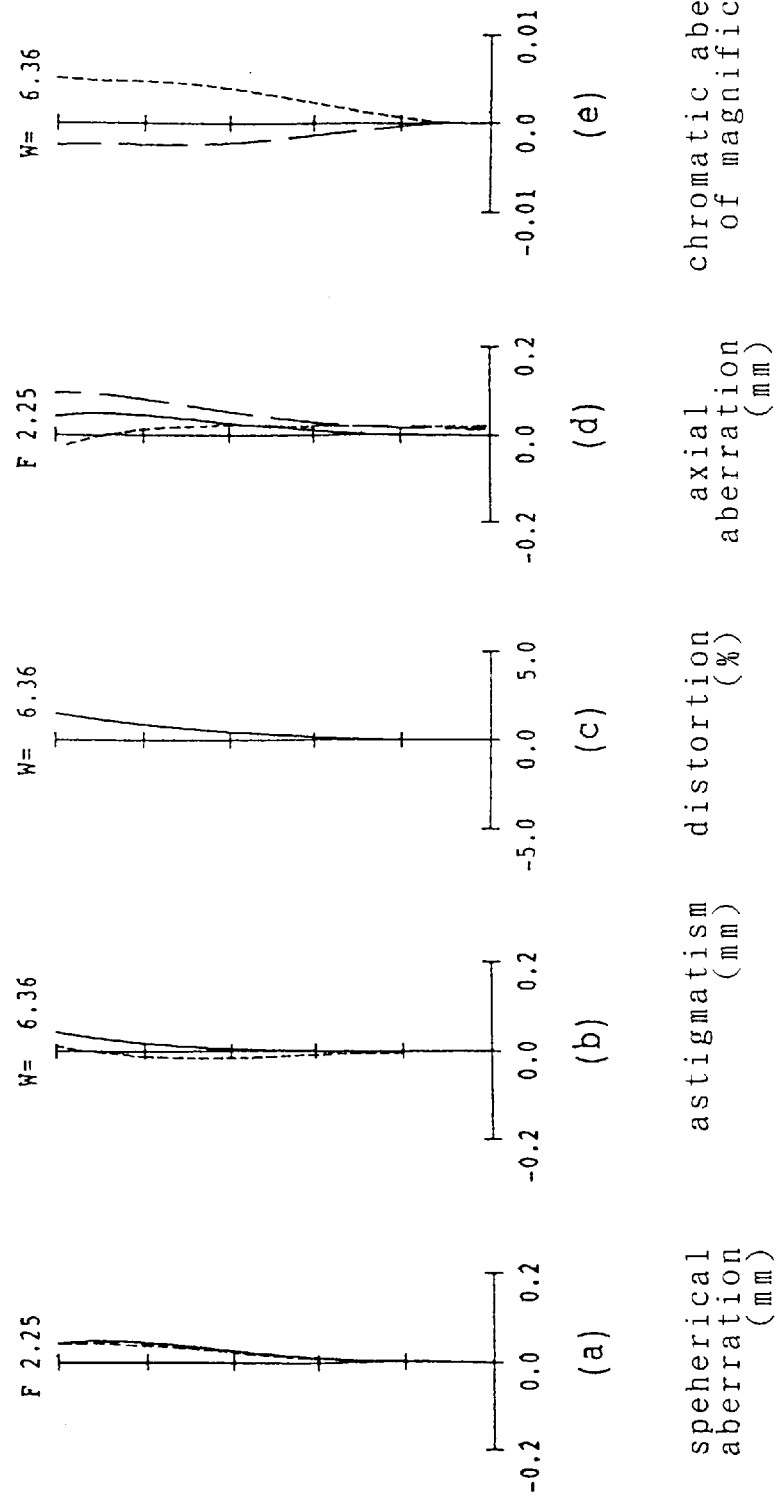
FIG. 4 is a view showing aberration at a standard position of the zoom lens system.
Figure 5:
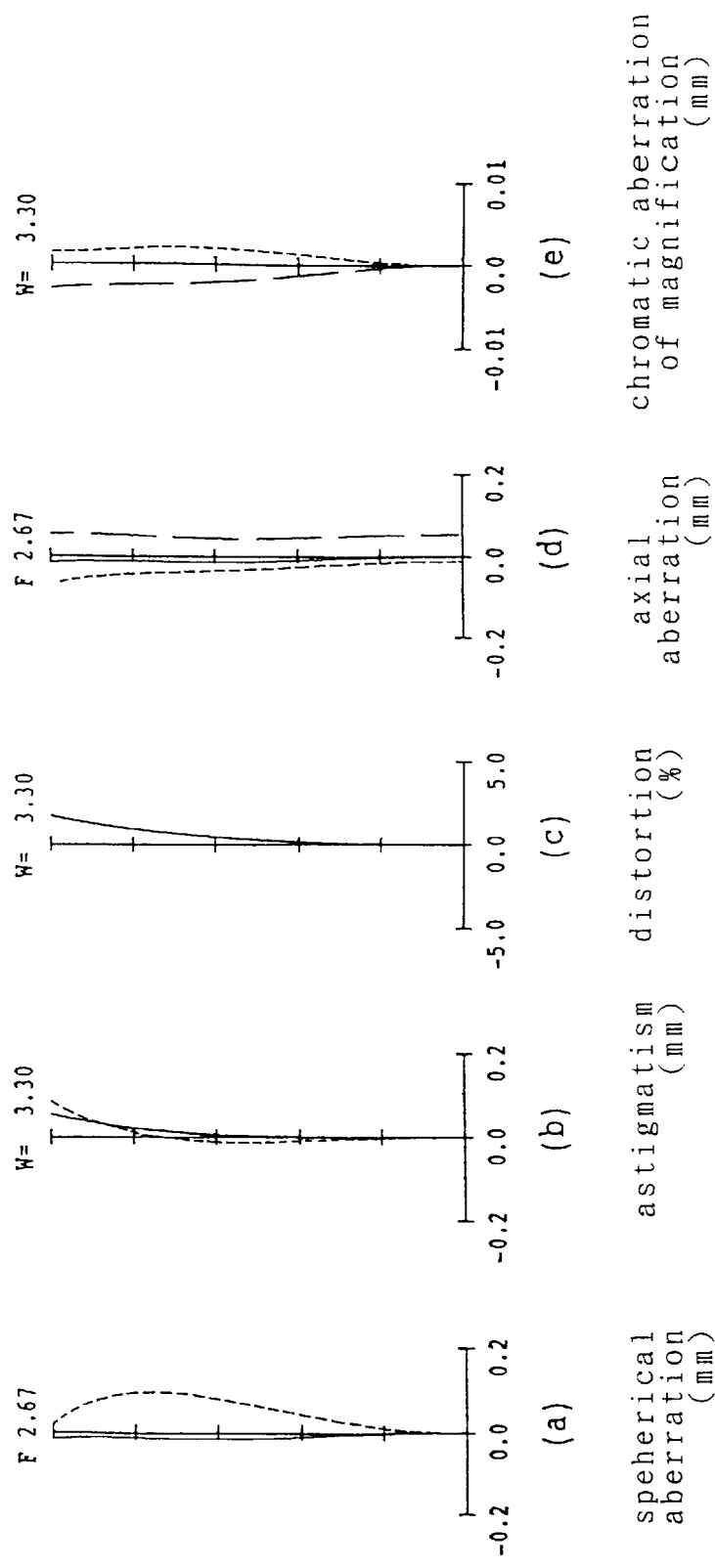
FIG. 5 is a view showing aberration at a telephoto limit of the zoom lens system.

FIG. 3, FIG. 4 and FIG. 5 are representations of aberration curves showing aberration capability of the aspherical zoom lens system in the above-mentioned first numerical example of the first embodiment.

Figure 6:
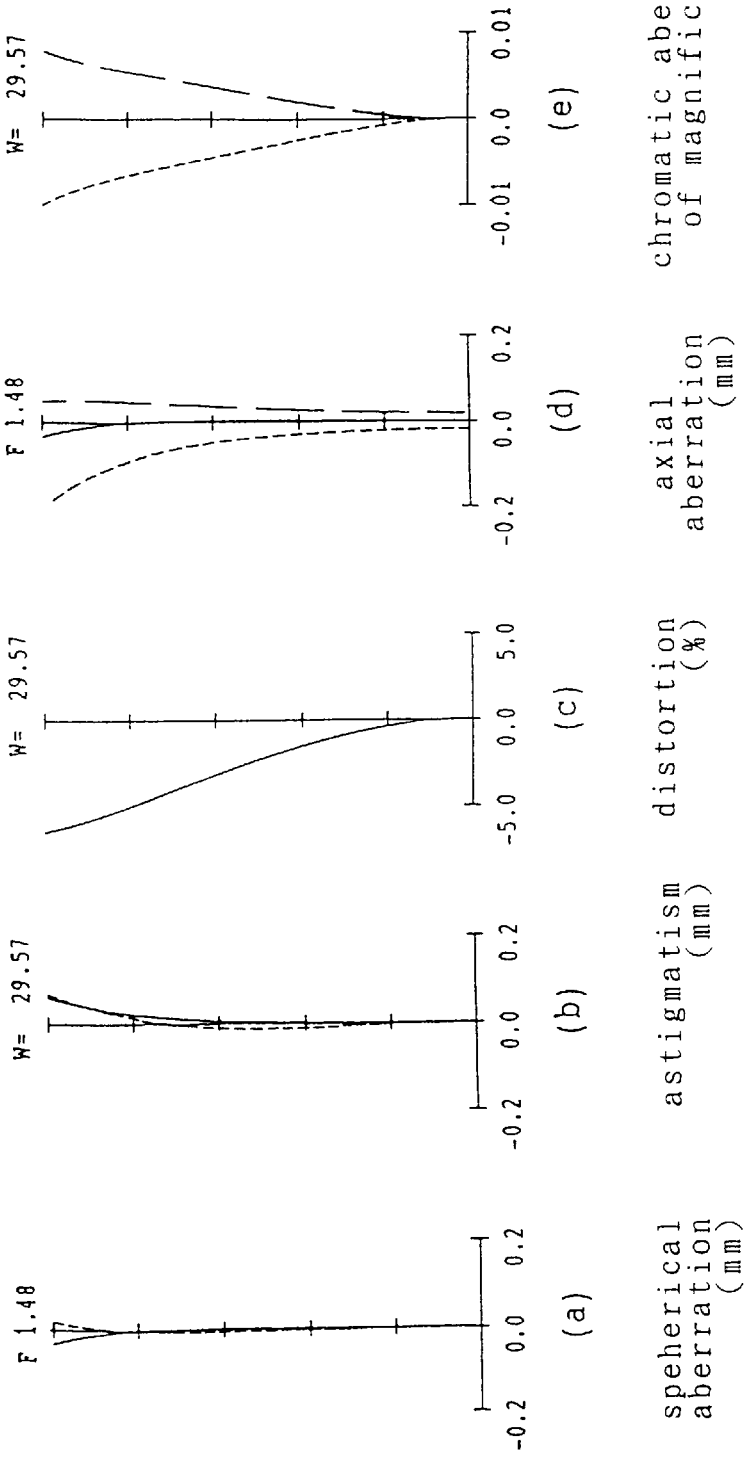
FIG. 6 is a view showing aberration capability at the wide-angle limit of a zoom lens system according to a second concrete numerical example of the first embodiment.
Figure 7:
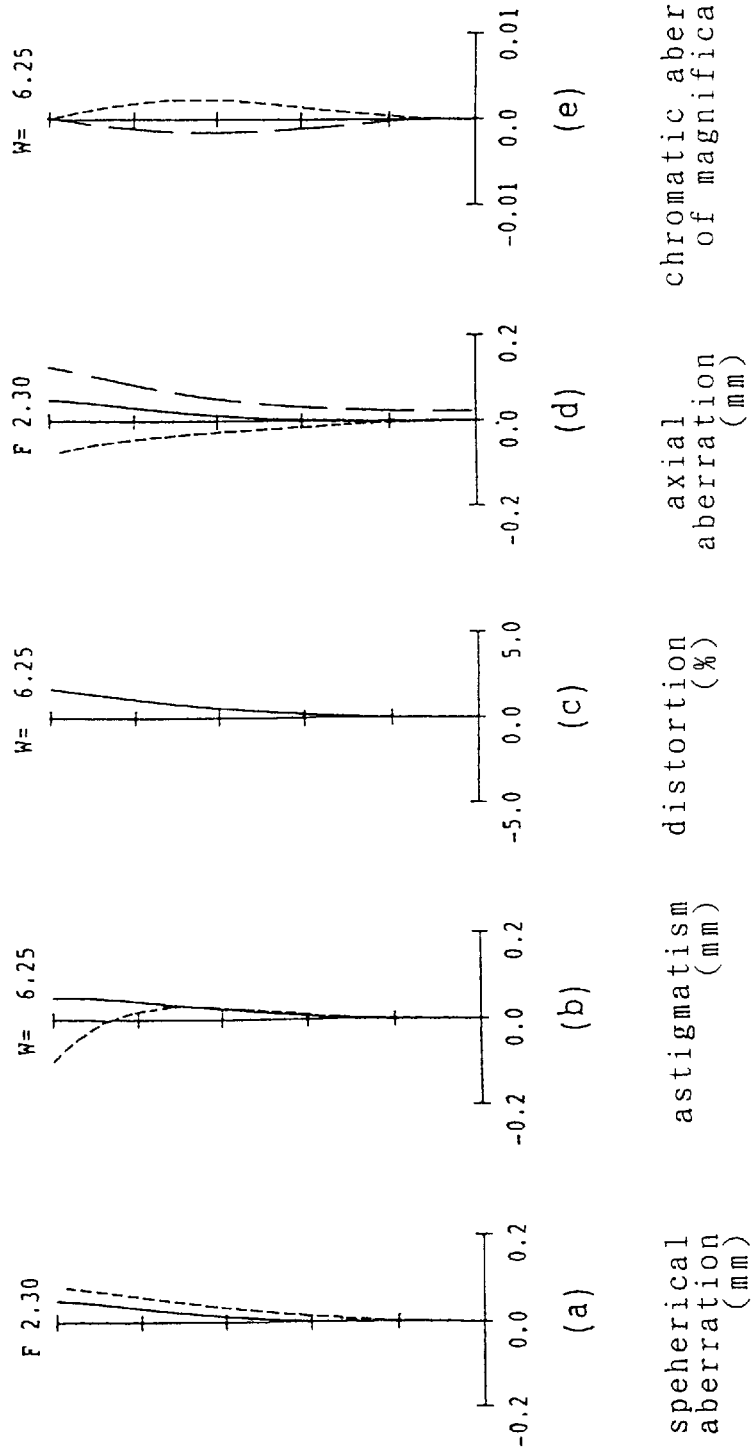
FIG. 7 is a view showing aberration at the standard position of the zoom lens system.
Figure 8:
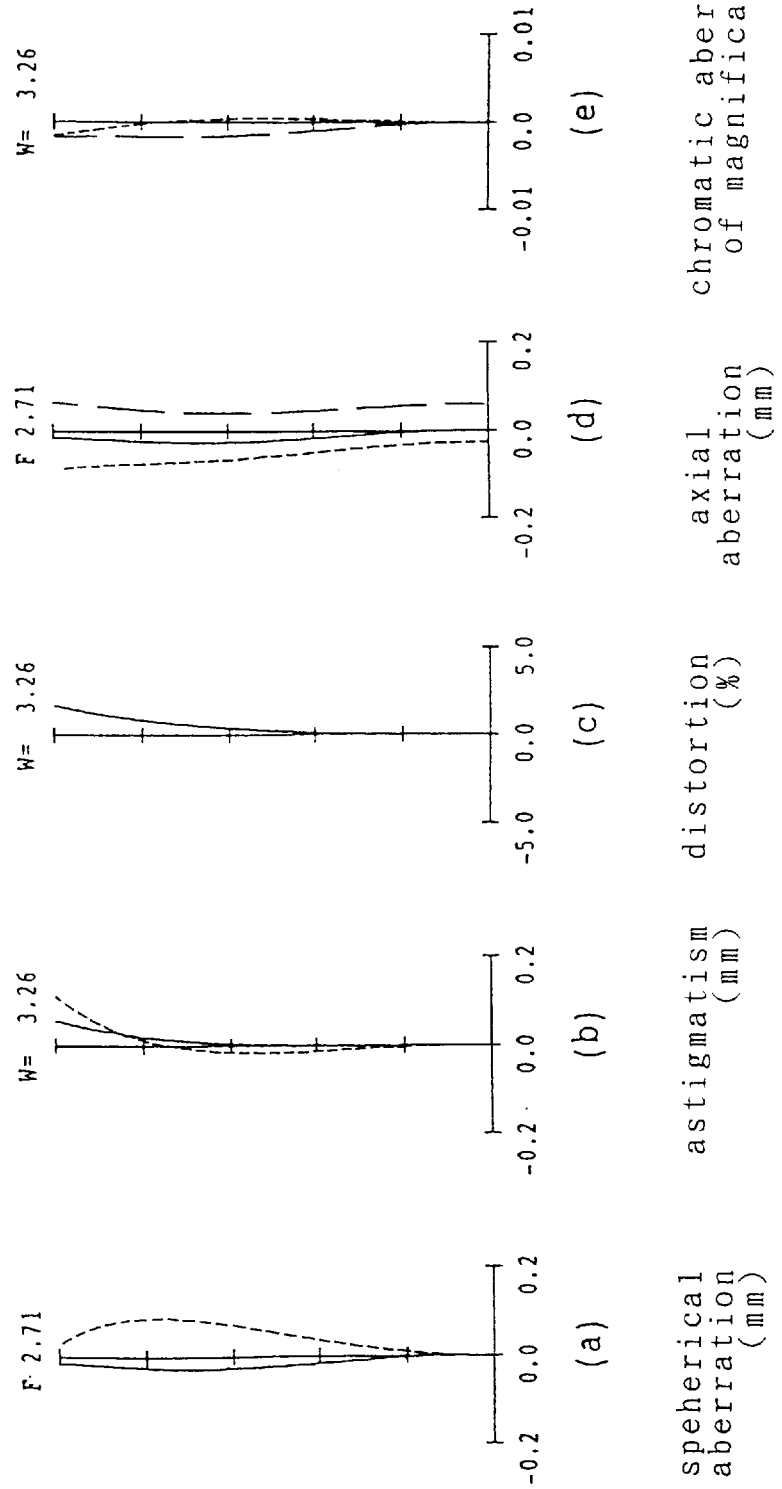
FIG. 8 is a view showing aberration at the telephoto limit of the zoom lens system.

FIG. 6, FIG. 7 and FIG. 8 show aberration capability of the aspherical zoom lens system in the above-mentioned second numerical example of the first embodiment.

Figure 9:
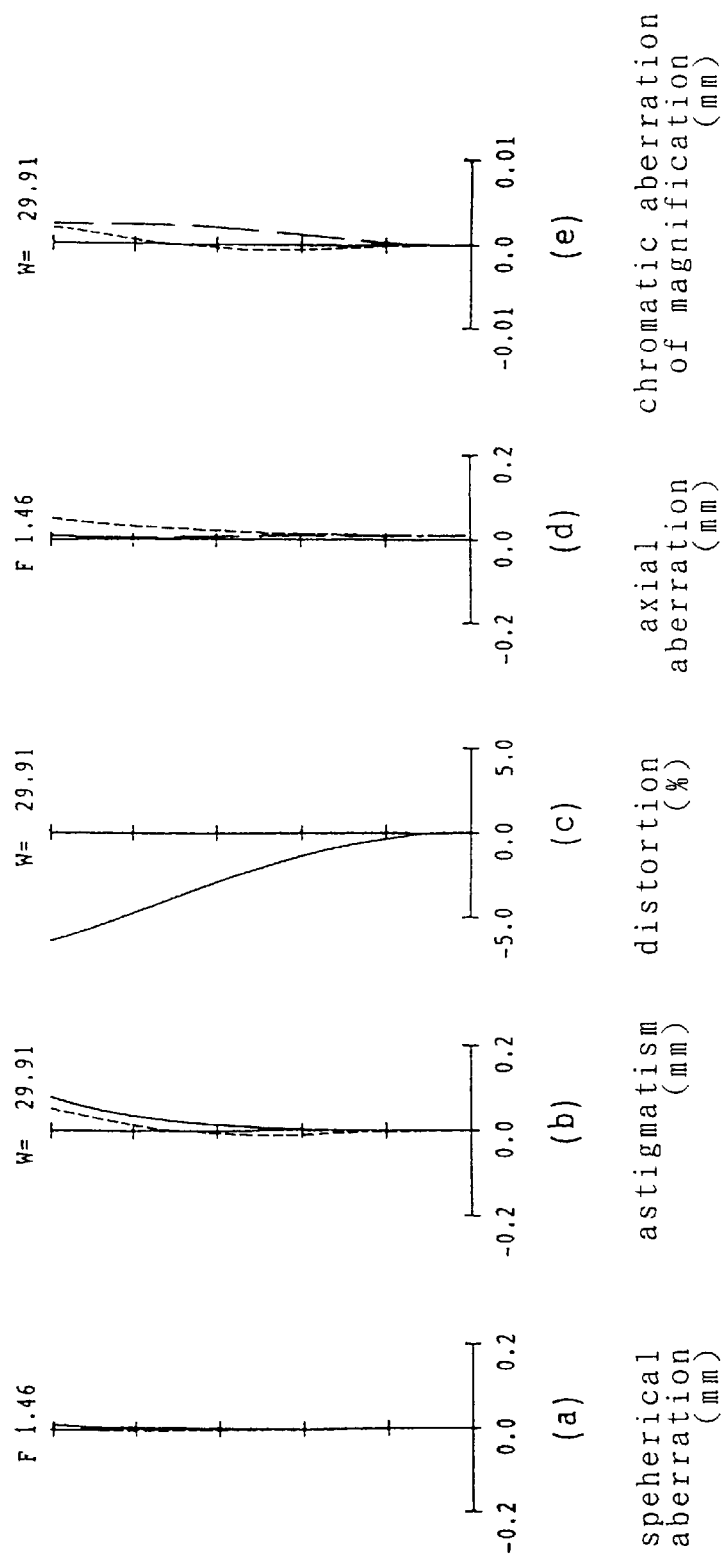
FIG. 9 is a view showing aberration capability at the wide-angle limit of a zoom lens system according to a third concrete numerical example of the first embodiment.
Figure 10:
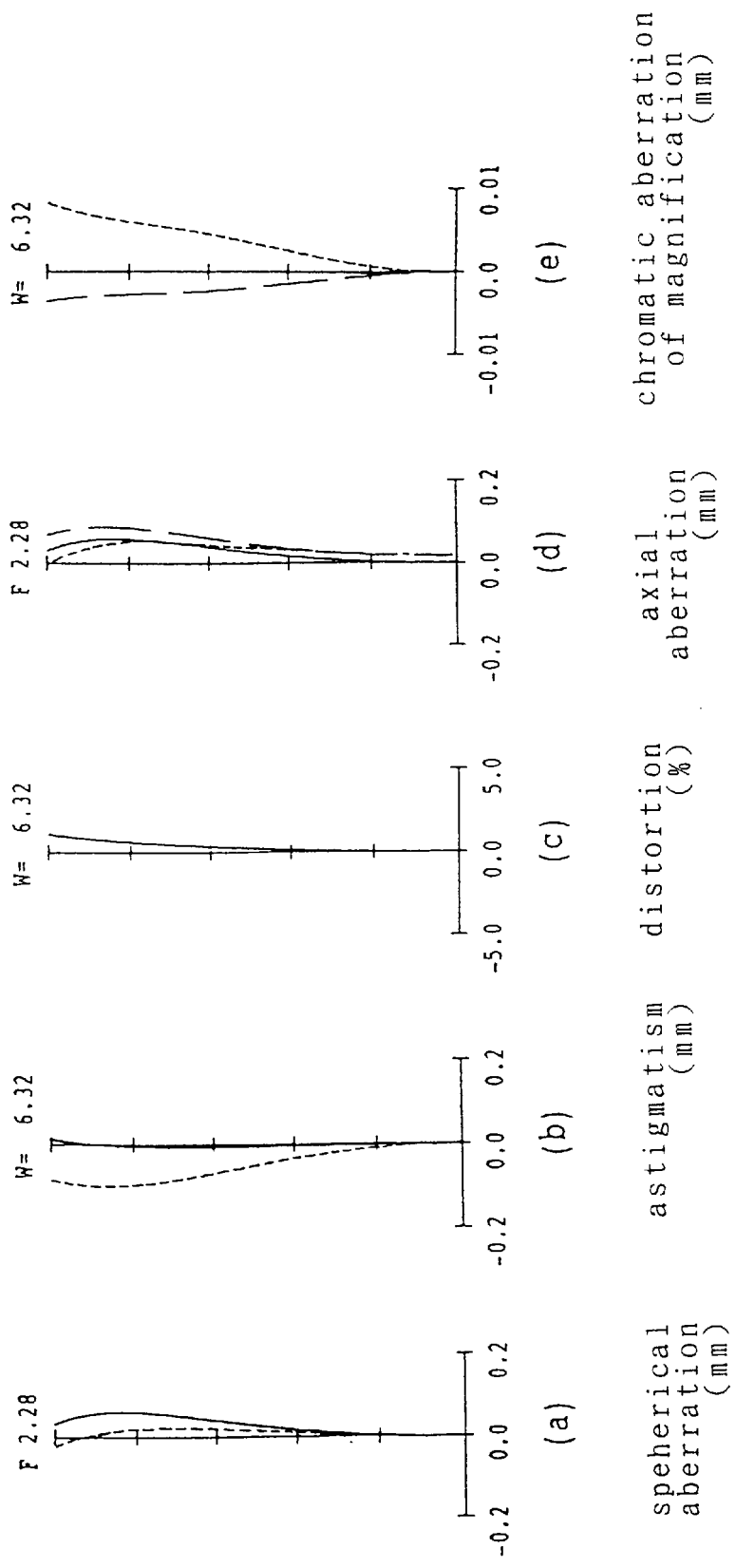
FIG. 10 is a view showing aberration at the standard position of the zoom lens system.
Figure 11:
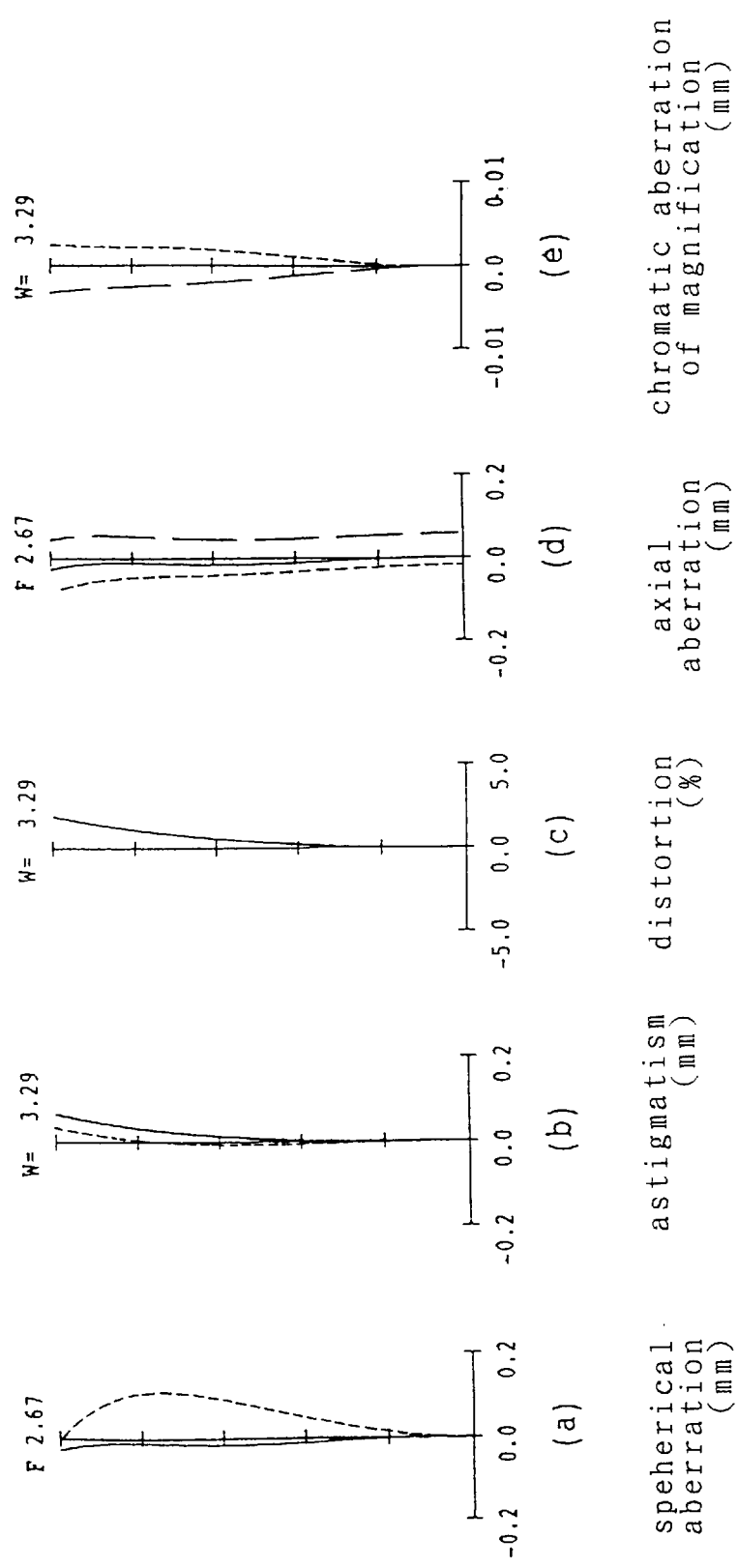
FIG. 11 is a view showing aberration at the telephoto limit of the zoom lens system.

FIG. 9, FIG. 10 and FIG. 11 show aberration capability of the aspherical zoom lens system in the above-mentioned third numerical example of the first embodiment.

Figure 12:
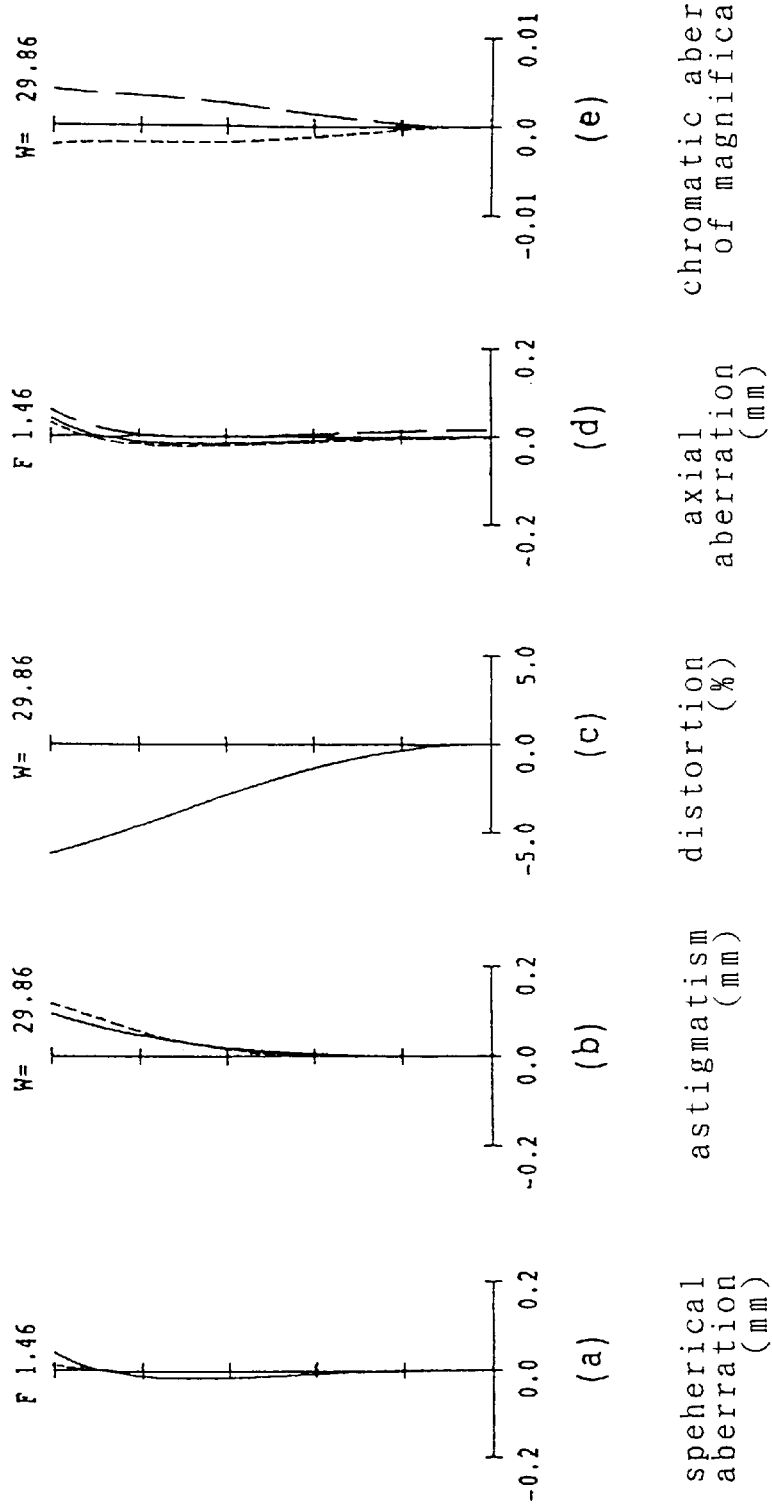
FIG. 12 is a view showing aberration capability at the wide-angle limit of a zoom lens system according to a fourth concrete numerical example of the first embodiment.
Figure 13:
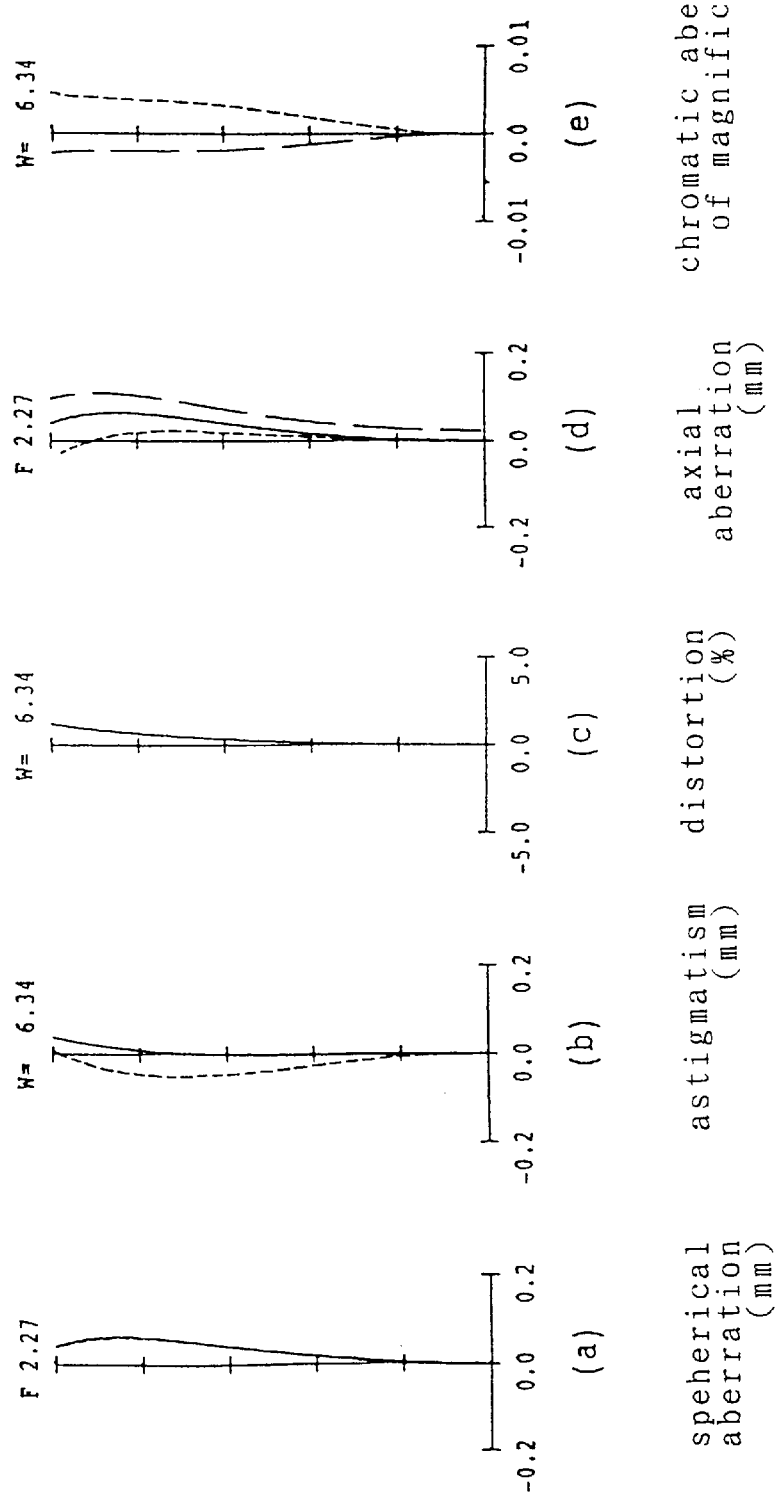
FIG. 13 is a view showing aberration at the standard position of the zoom lens system.
Figure 14:
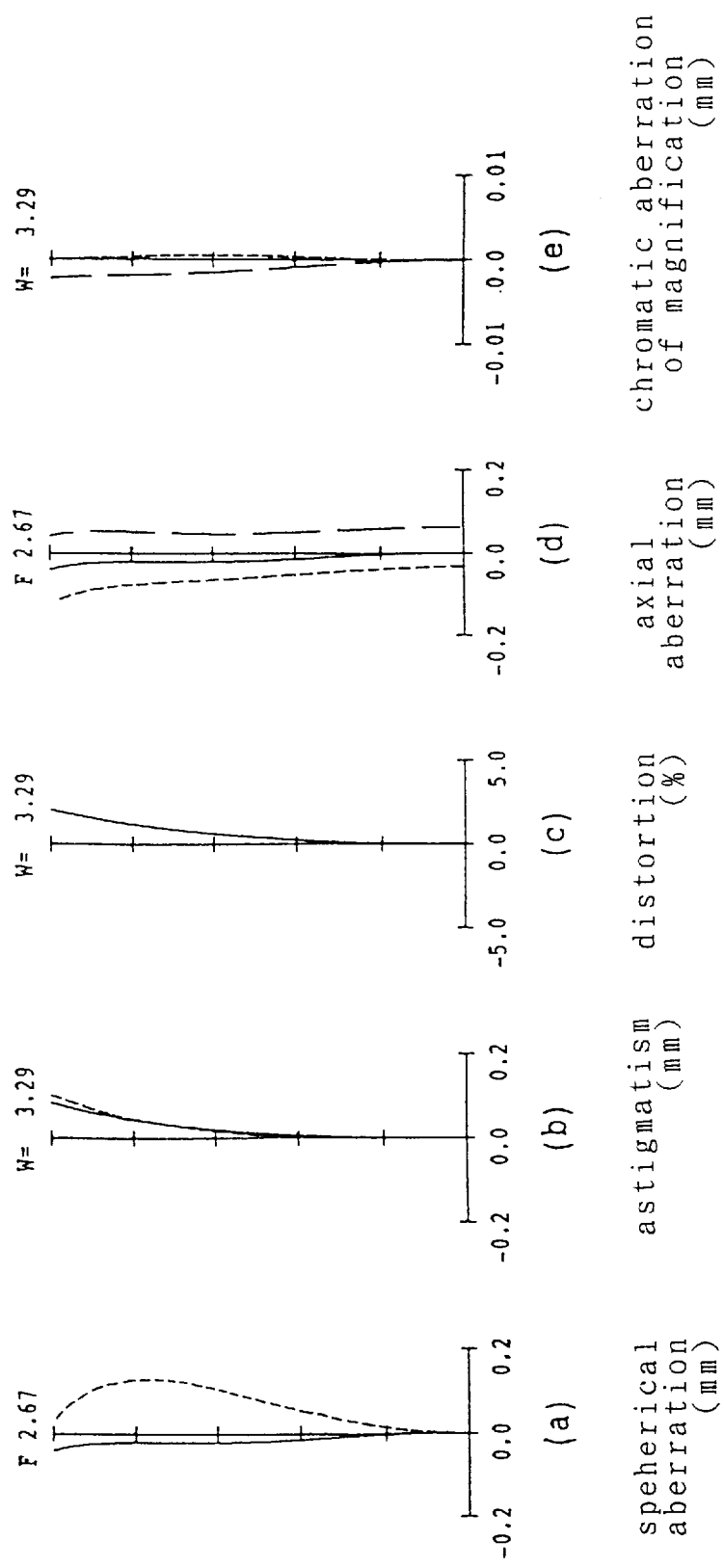
FIG. 14 is a view showing aberration at the telephoto limit of the zoom lens system.

FIG. 12, FIG. 13 and FIG. 14 show aberration capability of the aspherical zoom lens system in the above-mentioned fourth numerical example of the first embodiment.

Figure 15:
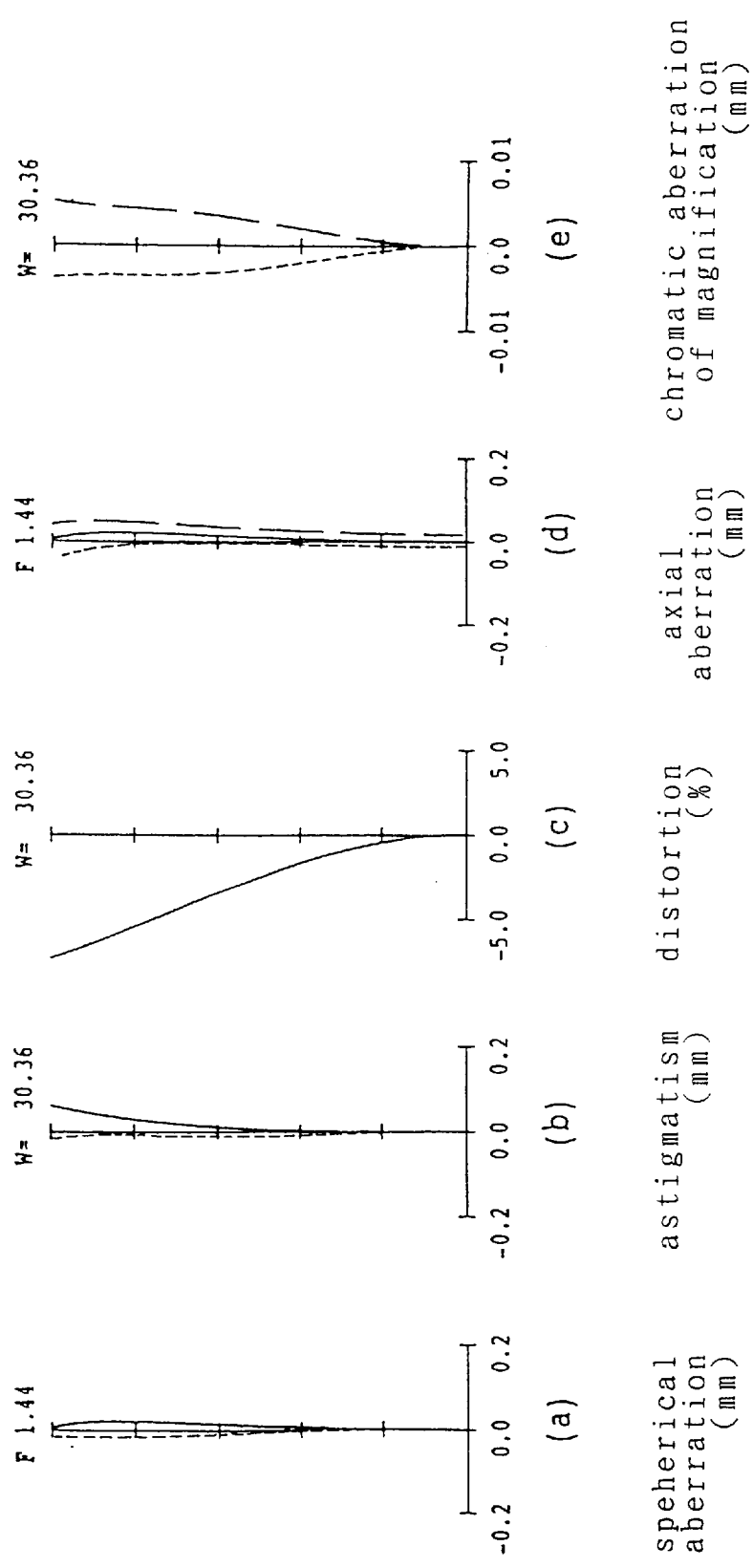
FIG. 15 is a view showing aberration capability at the wide-angle limit of a zoom lens system according to a fifth concrete numerical example of the first embodiment.
Figure 16:
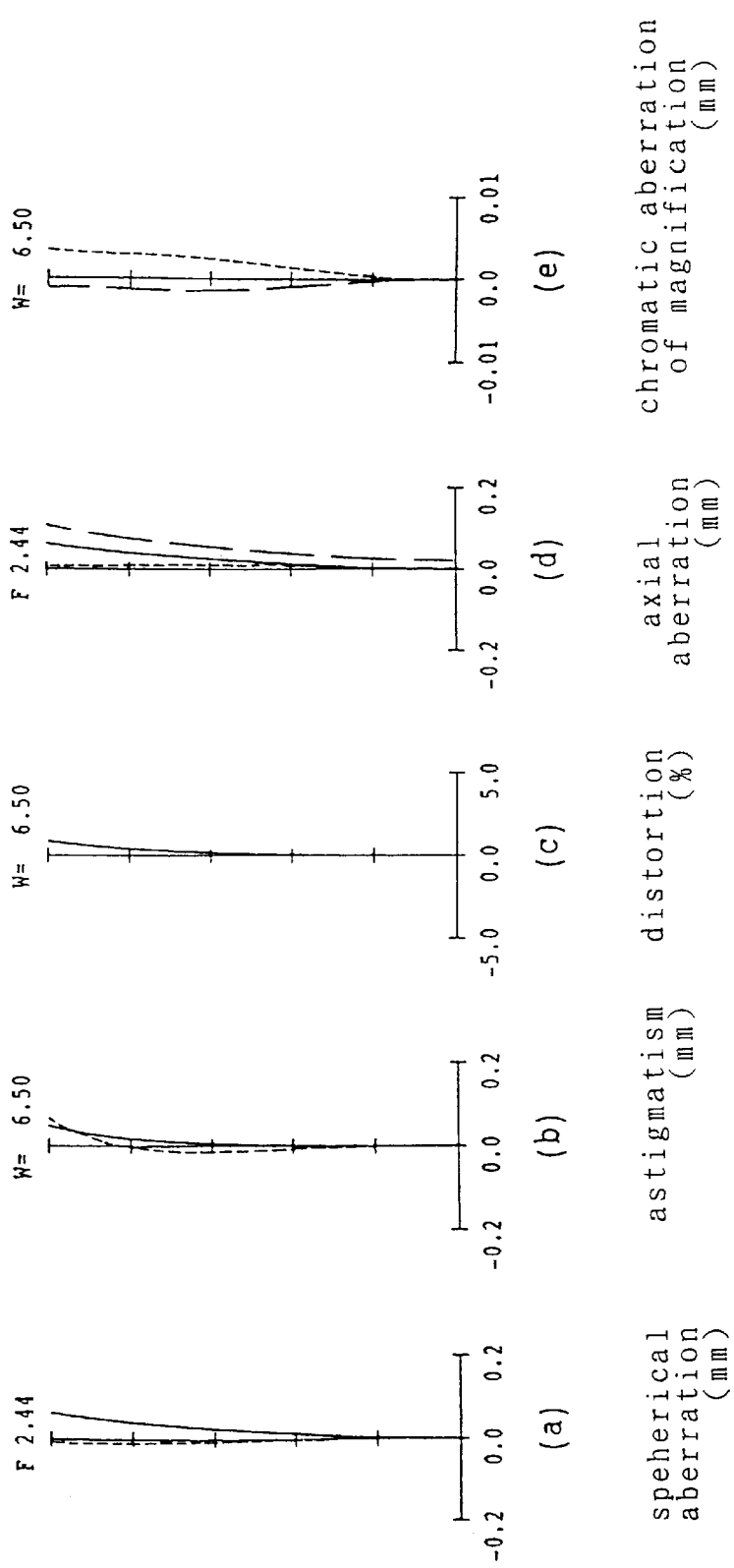
FIG. 16 is a view showing aberration at the standard position of the zoom lens system.
Figure 17:
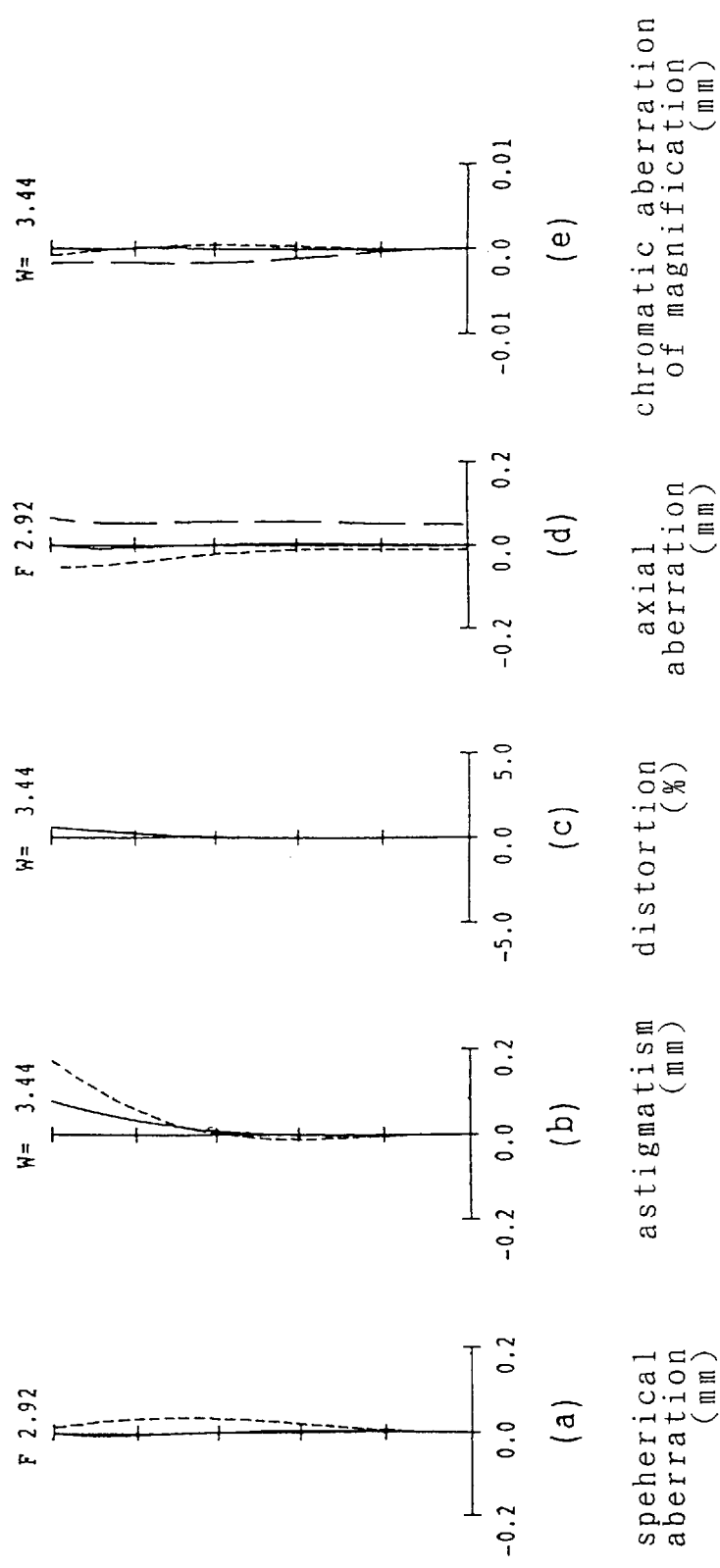
FIG. 17 is a view showing aberration at the telephoto limit of the zoom lens system.

FIG. 15, FIG. 16 and FIG. 17 show aberration capability of the aspherical zoom lens system in the above-mentioned fifth numerical example of the first embodiment.

Figure 18:
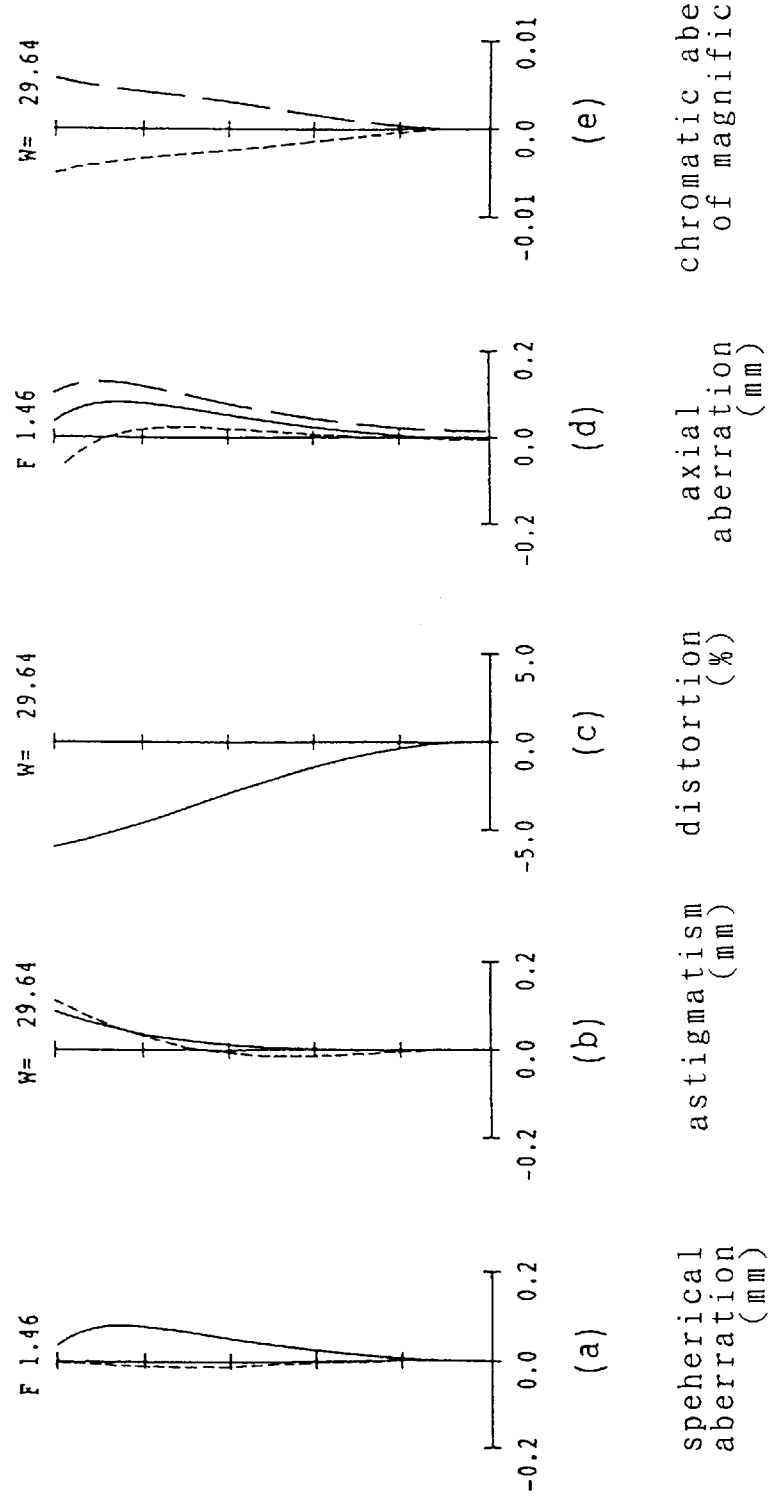
FIG. 18 is a view showing aberration capability at the wide-angle limit of a zoom lens system according to a sixth concrete numerical example of the first embodiment.
Figure 19:
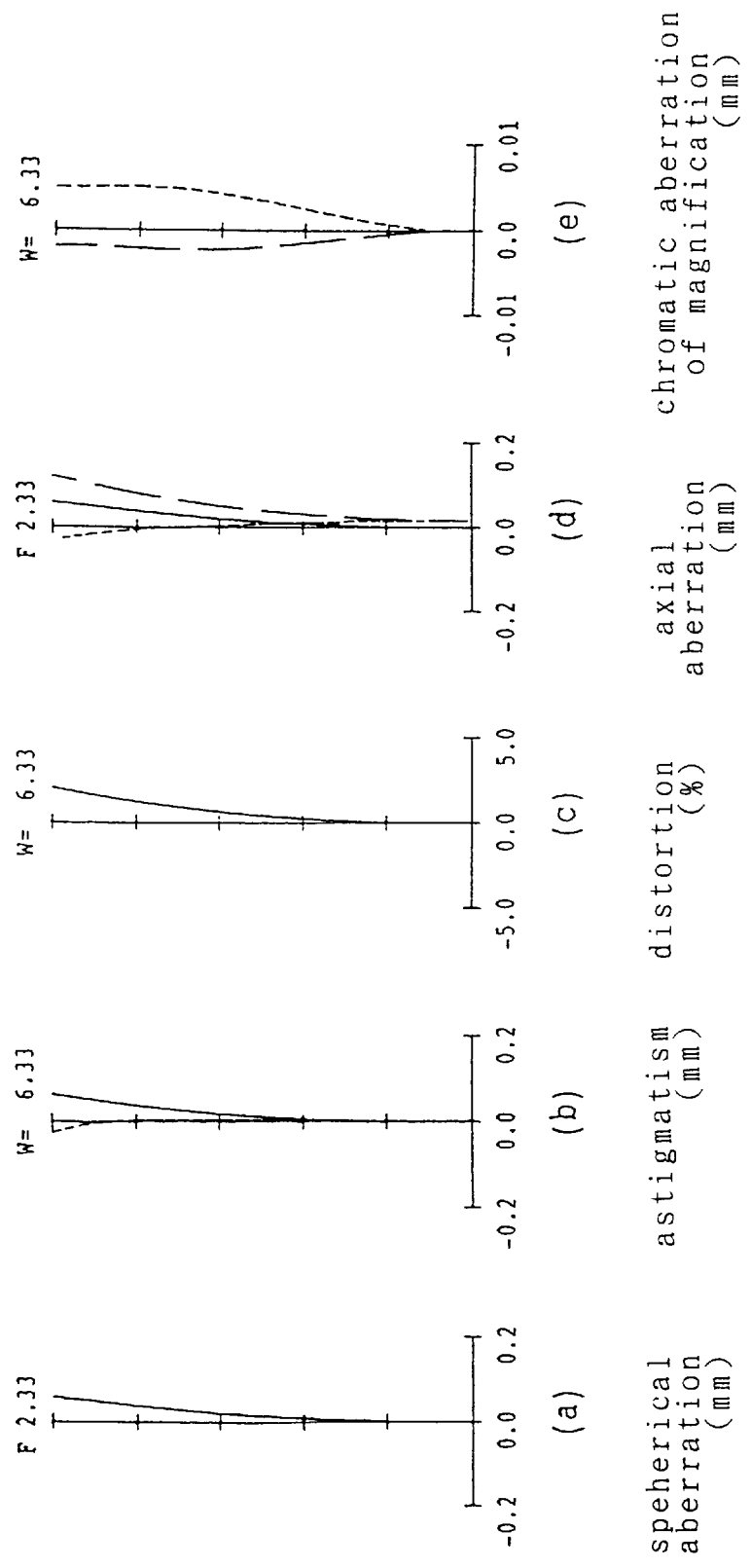
FIG. 19 is a view showing aberration at the standard position of the zoom lens system.
Figure 20:
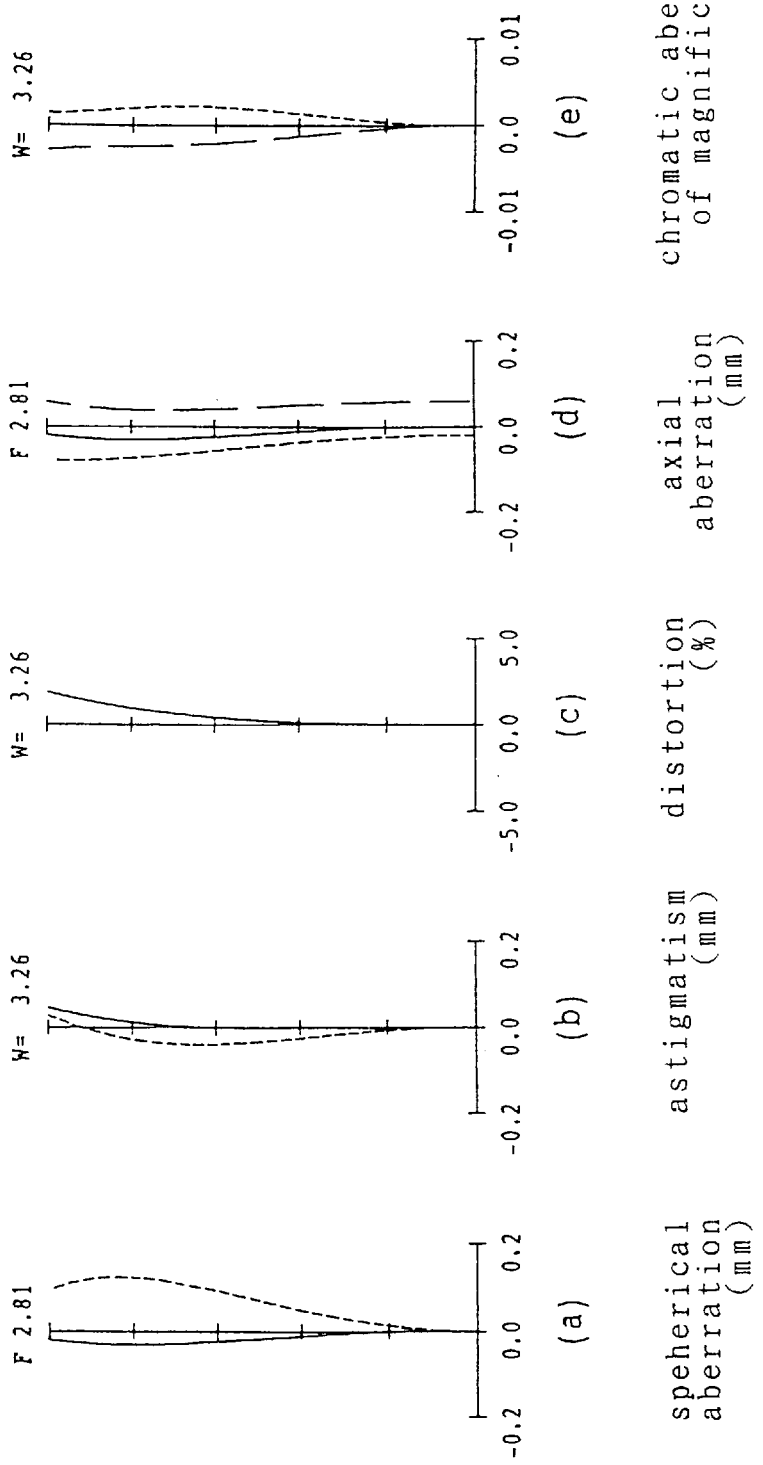
FIG. 20 is a view showing aberration at the telephoto limit of the zoom lens system.

FIG. 18, FIG. 19 and FIG. 20 show aberration capability of the aspherical zoom lens system in the above-mentioned sixth numerical example of the first embodiment.

Figure 21:
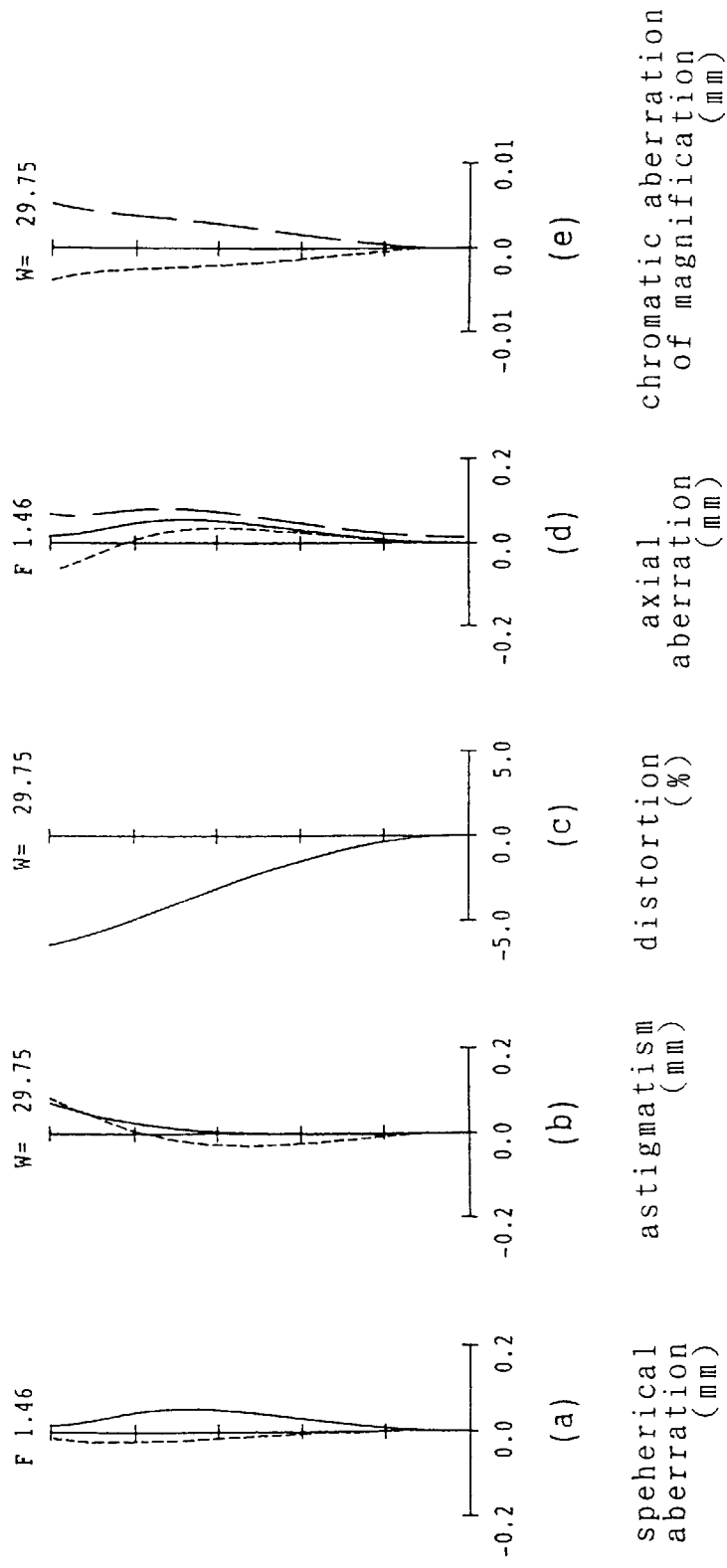
FIG. 21 is a view showing aberration capability at the wide-angle limit of a zoom lens system according to a seventh concrete numerical example of the first embodiment.
Figure 22:
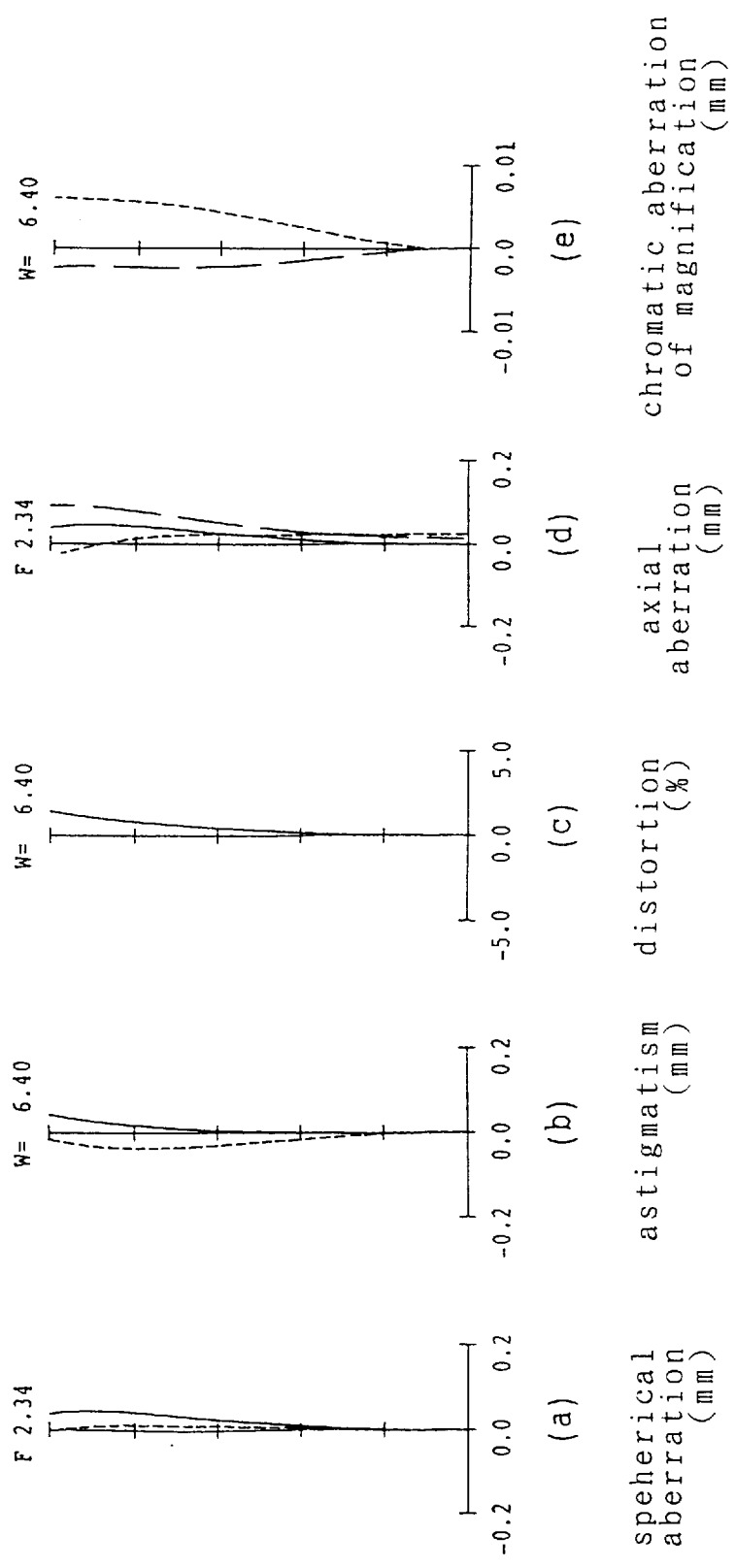
FIG. 22 is a view showing aberration at the standard position of the zoom lens system.
Figure 23:
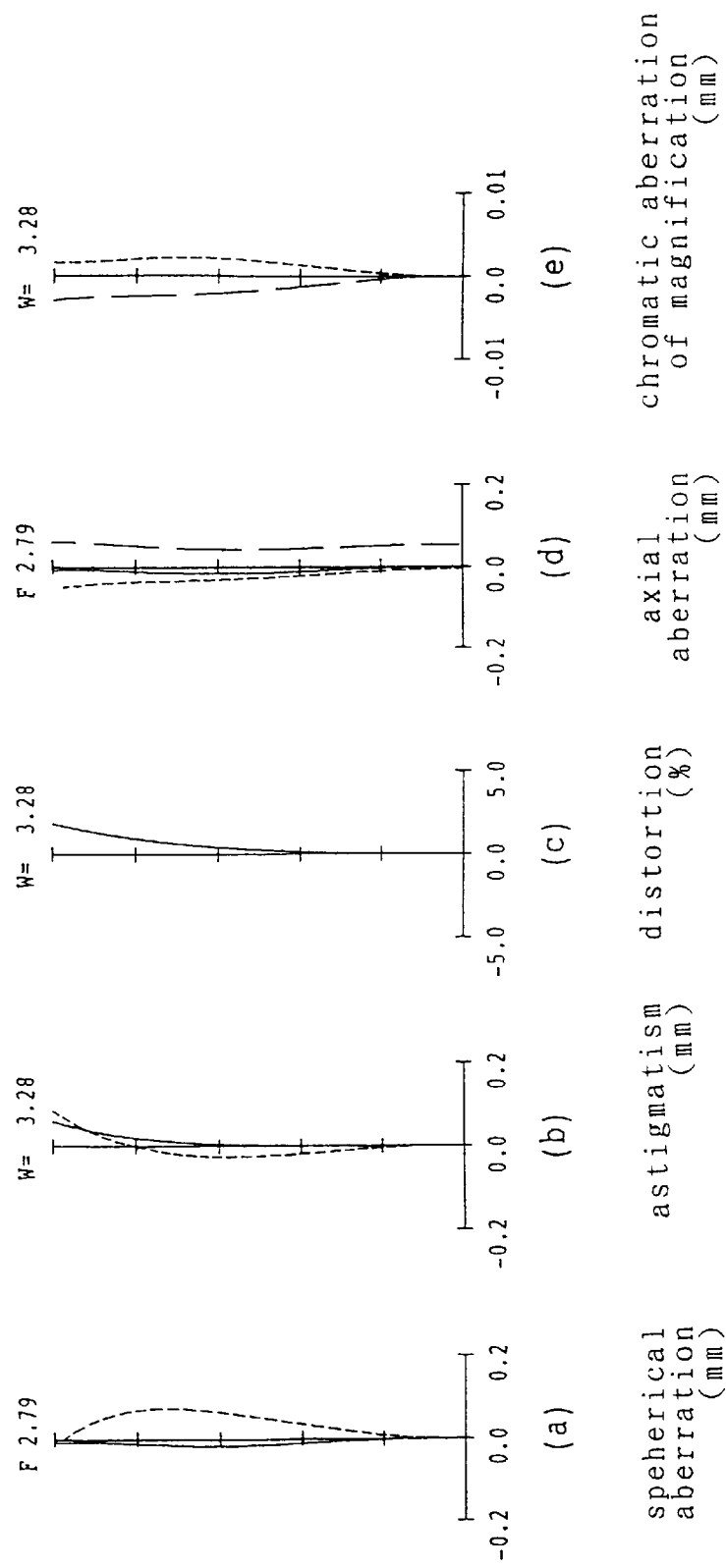
FIG. 23 is a view showing aberration at the telephoto limit of the zoom lens system.

FIG. 21, FIG. 22 and FIG. 23 show aberration capability of the aspherical zoom lens system in the above-mentioned seventh numerical example of the first embodiment.

Figure 24:
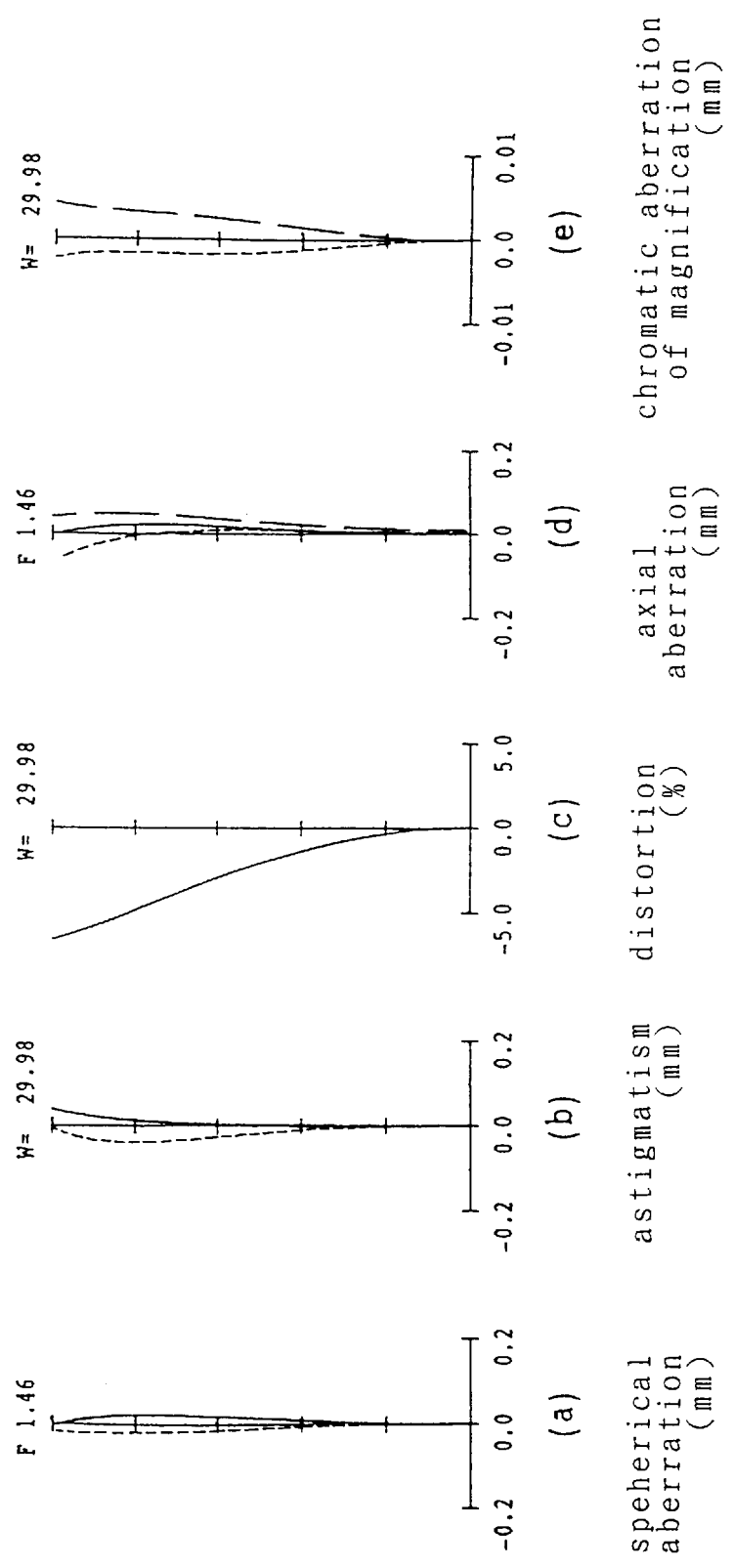
FIG. 24 is a view showing aberration capability at the wide-angle limit of a zoom lens system according to an eighth concrete numerical example of the first embodiment.
Figure 25:
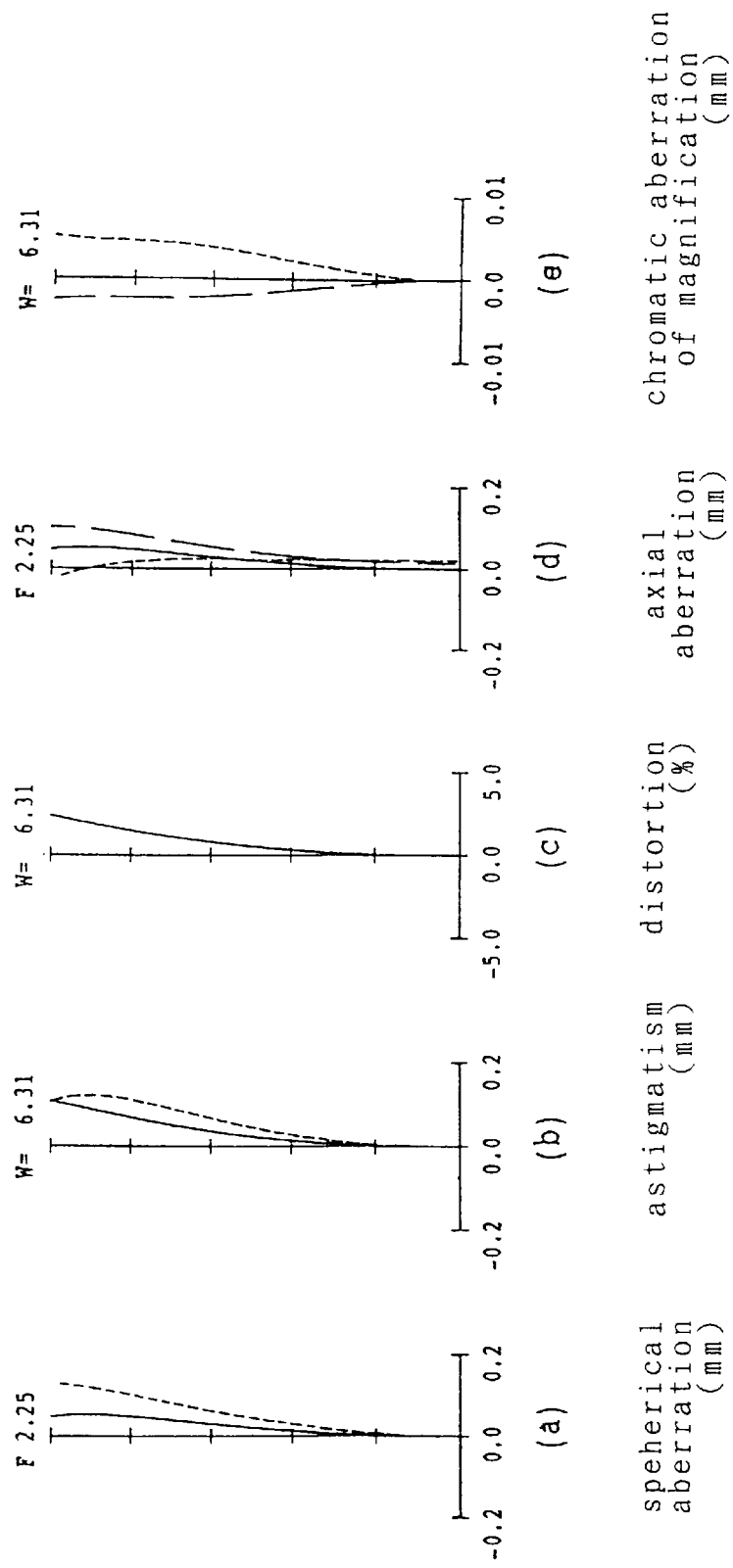
FIG. 25 is a view showing aberration at the standard position of the zoom lens system.
Figure 26:
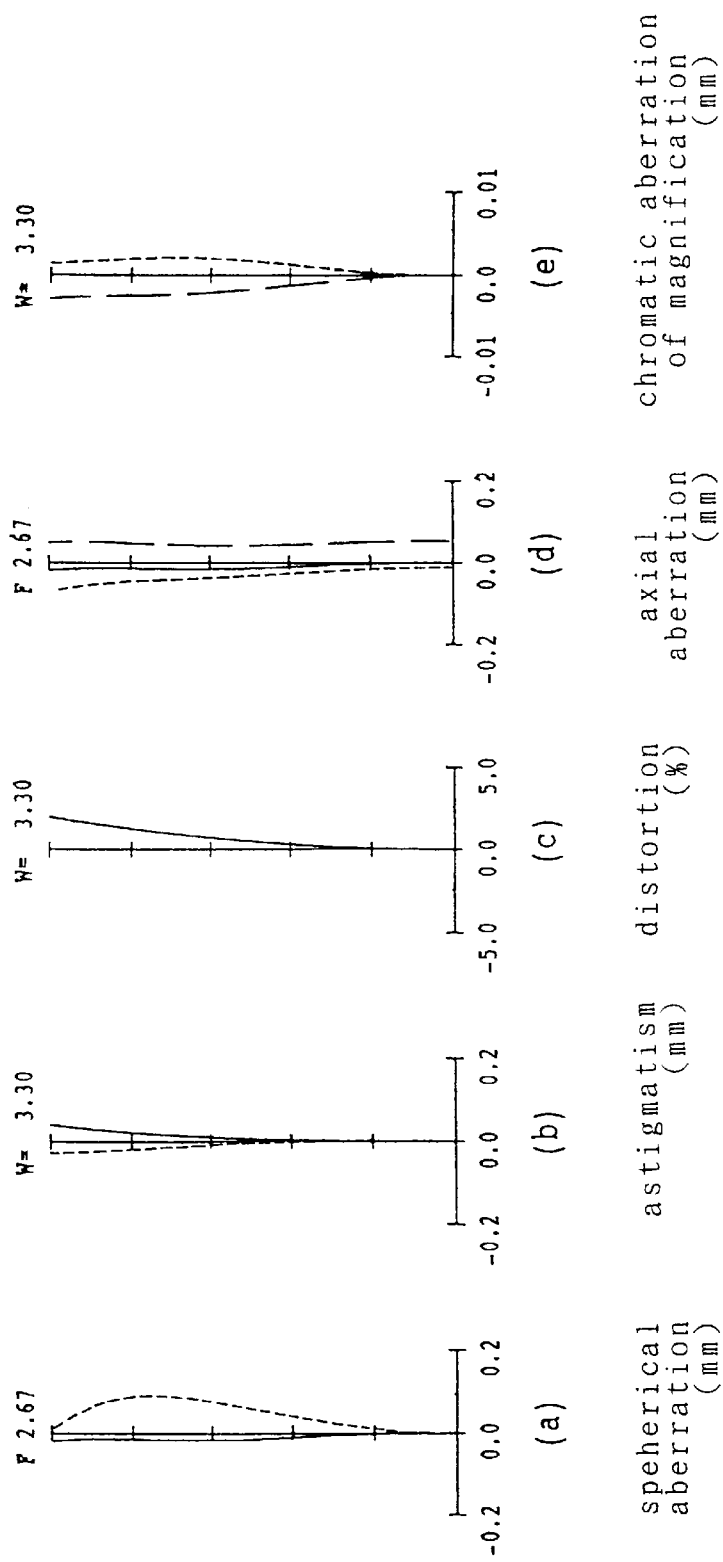
FIG. 26 is a view showing aberration at the telephoto limit of the zoom lens system.

FIG. 24, FIG. 25 and FIG. 26 show aberration capability of the aspherical zoom lens system in the above-mentioned eighth numerical example of the first embodiment.

In these figures, (a) is a drawing of spherical aberration, wherein the solid line represents the value to the d-line and the dotted line represents the sine condition; (b) is a drawing of astigmatism, wherein the solid line represents the sagittal curvature of field and the dotted line represents the meridional curvature of field; (c) is a drawing of distortion aberration and (d) is a drawing of axial aberration, wherein the solid line, the dotted line and the broken line represent the values to the d-line, the F-line and the C-line, respectively; (e) is a drawing of chromatic aberration of magnification, wherein the dotted line and the broken line represent the values to the F-line and the C-line, respectively. From these figures, it is apparent that the zoom lens systems according to the above-mentioned eight concrete numerical examples of the embodiment have excellent optical capability.

<<Numerical Example of the Second Embodiment>>

A concrete numerical example of the second embodiment is shown in Table 25 below. In this numerical example, the value of $(fw \times \tan\omega)/(f1 \times |f2|)^{1/2}$ is set at 0.289. The value of $fw \times |p3c|$ is set at 0.652.

In Table 25, r represents the radius of curvature of the respective lens elements, d represents the thickness of the lens elements or the air spaces between the lens elements, n represents the refractive index of the respective lens elements to the d-line, and $\upsilon$ represents Abbe number of the respective lens elements to the d-line.

TABLE 25

| Lens | Surface | r | d | n | $\upsilon$ |
|---|---|---|---|---|---|
|  | S1 | 48.298 |  |  |  |
| 1a |  |  | 0.90 | 1.50518 | 25.4 |
|  | S2 | 17.769 |  |  |  |
| 1b |  |  | 4.53 | 1.60311 | 60.7 |
|  | S3 | −67.792 |  |  |  |
|  |  |  | 0.20 |  |  |
|  | S4 | 14.615 |  |  |  |
| 1c |  |  | 2.67 | 1.69680 | 55.5 |
|  | S5 | 42.519 |  |  |  |
|  |  |  | Variable |  |  |
|  | S6 | 42.519 |  |  |  |
| 2a |  |  | 0.60 | 1.77250 | 49.6 |
|  | S7 | 4.840 |  |  |  |
|  |  |  | 2.15 |  |  |
|  | S8 | −6.475 |  |  |  |

TABLE 25-continued

| Lens | Surface | r | d | n | $\upsilon$ |
|---|---|---|---|---|---|
| 2b |  |  | 0.80 | 1.66547 | 55.2 |
|  | S9 | 5.884 |  |  |  |
| 2c |  |  | 1.80 | 1.80518 | 25.4 |
|  | S10 | −317.238 |  |  |  |
|  |  |  | Variable |  |  |
|  | S11 | 7.718 |  |  |  |
| 3a |  |  | 4.60 | 1.66547 | 55.2 |
|  | S12 | −12.767 |  |  |  |
|  |  |  | 0.10 |  |  |
|  | S13 | 15.123 |  |  |  |
| 3b |  |  | 2.40 | 1.51633 | 64.1 |
|  | S14 | −37.470 |  |  |  |
|  |  |  | 0.10 |  |  |
|  | S15 | −47.282 |  |  |  |
| 3c |  |  | 0.60 | 1.84666 | 23.9 |
|  | S16 | 6.340 |  |  |  |
|  |  |  | Variable |  |  |
|  | S17 | 8.043 |  |  |  |
| 4a |  |  | 2.50 | 1.51450 | 63.1 |
|  | S18 | −25.947 |  |  |  |
|  |  |  | Variable |  |  |
|  | S19 | ∞ |  |  |  |
| 5 |  |  | 4.0 | 1.51633 | 64.1 |
|  | S20 | ∞ |  |  |  |

The aspherical configuration is defined by the above-described expression (26).

The lens surfaces with the surface numbers S8, S11, S12 and S17 are aspherical and their aspherical coefficients are shown in Table 26 below.

TABLE 26

| | Surface | | | |
|---|---|---|---|---|
| | S8 | S11 | S12 | S17 |
| K | −1.46313 | −7.54703 × 10$^{-1}$ | −6.04953 | 2.92653 × 10$^{-1}$ |
| D | −6.71083 × 10$^{-4}$ | −1.78353 × 10$^{-4}$ | 2.71911 × 10$^{-6}$ | −2.24651 × 10$^{-4}$ |
| E | −2.14482 × 10$^{-5}$ | 9.08433 × 10$^{-8}$ | 8.94155 × 10$^{-8}$ | −9.28589 × 10$^{-6}$ |
| F | 0.0 | 0.0 | 0.0 | 0.0 |

As an example of the air space which is variable during zooming, values at an object point of 2 m are shown in Table 27 below. In this table, the standard position is a zoom position whereat the magnification borne by the second lens unit 2 is 1. In the table, f, F/NO and $\omega$ represent the focal lengths, f-numbers and incident half view angles at the wide-angle limit, the standard position and the telephoto limit, respectively. Moreover, di (i=5, 10, 16, 18) represents the air spaces between the lens elements at the wide-angle limit, the standard position and the telephoto limit.

TABLE 27

| | Wide-angle limit | Standard position | Telephoto limit |
|---|---|---|---|
| f | 4.886 | 23.143 | 44.946 |
| F/NO | 1.49 | 2.28 | 2.70 |
| 2$\omega$ (°) | 59.23 | 12.52 | 6.53 |
| d5 | 0.700 | 9.807 | 12.450 |
| d10 | 13.389 | 4.276 | 1.633 |
| d15 | 6.099 | 1.501 | 4.968 |
| d17 | 1.000 | 5.598 | 2.132 |

Concrete values for the conditional expressions (3) to (6) and (13) to (17) in the numerical example of the second embodiment are shown below.

fw/f1=0.225    Conditional expression (3)

fw/|f2|=1.151    Conditional expression (4)

fw/f3=0.441    Conditional expression (5)

fw/f4=0.399    Conditional expression (6)

f31/|f323|=0.747    Conditional expression (13)

r311/r319=0.529    Conditional expression (14)

r321/r329=0.290    Conditional expression (15)

r211/r219=1.108    Conditional expression (16)

r411/r419=0.681    Conditional expression (17)

Figure 27:
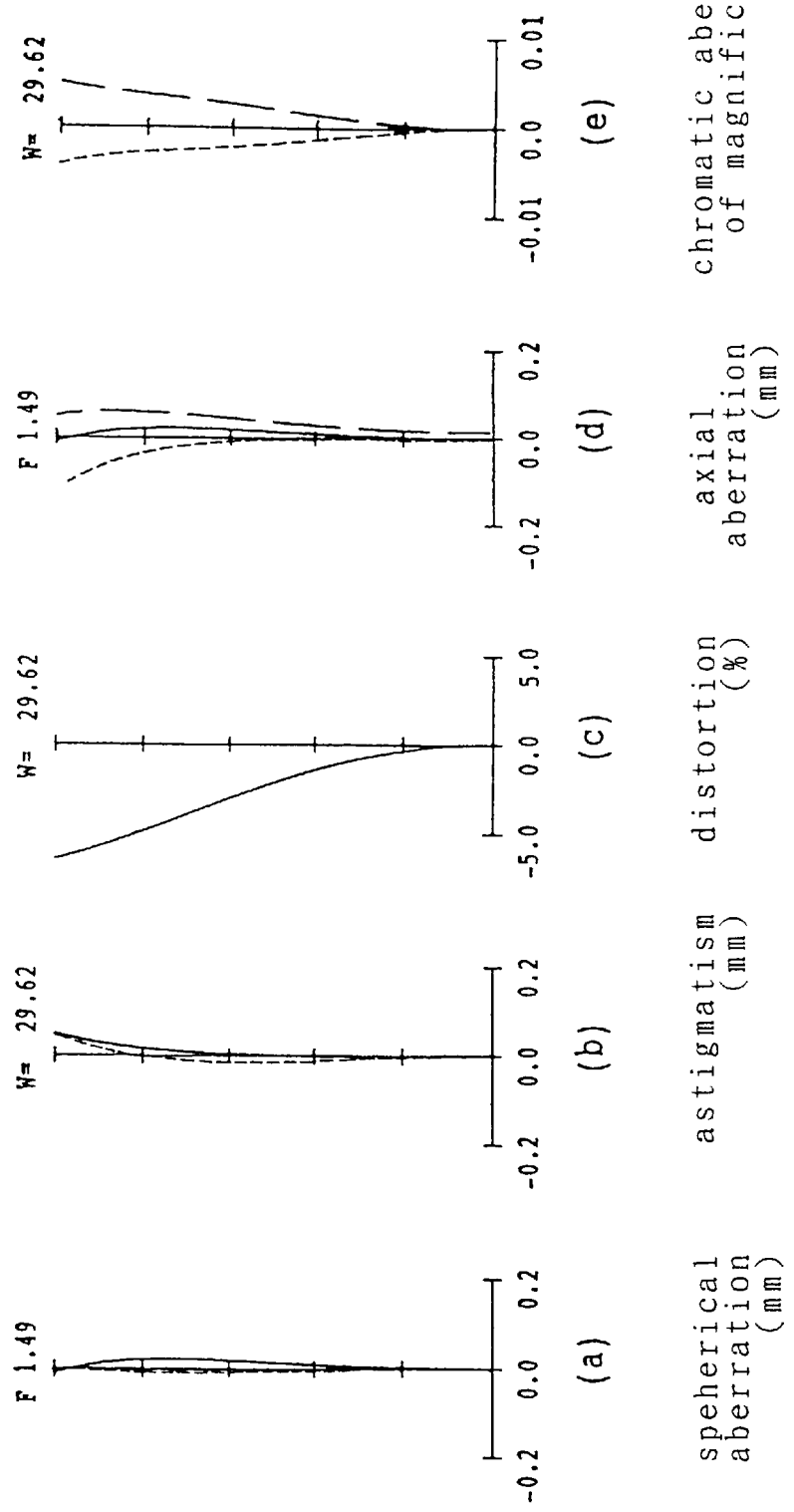
FIG. 27 is a view showing aberration capability at the wide-angle limit of a zoom lens system according to a concrete numerical example of the second embodiment.
Figure 28:
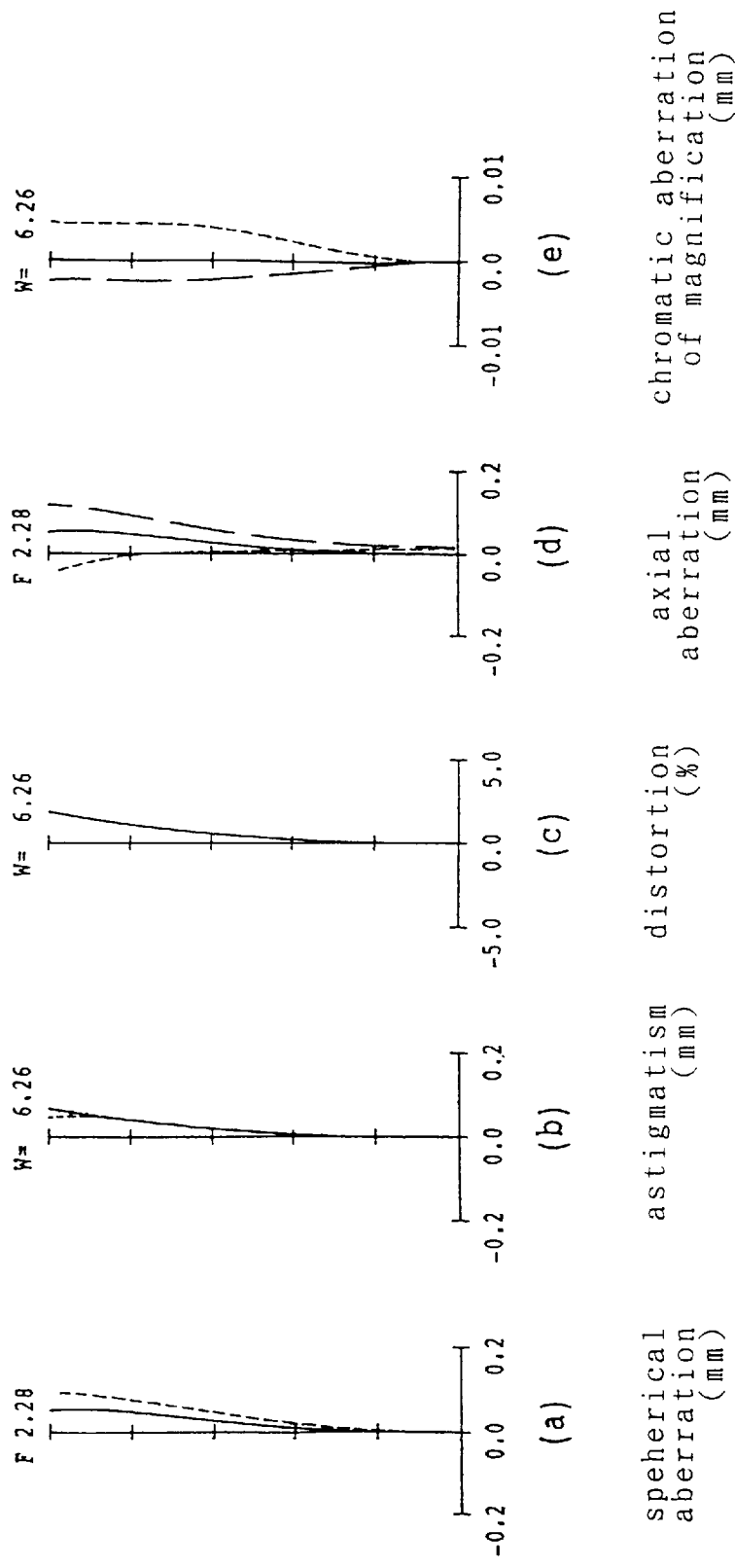
FIG. 28 is a view showing aberration at the standard position of the zoom lens system.
Figure 29:
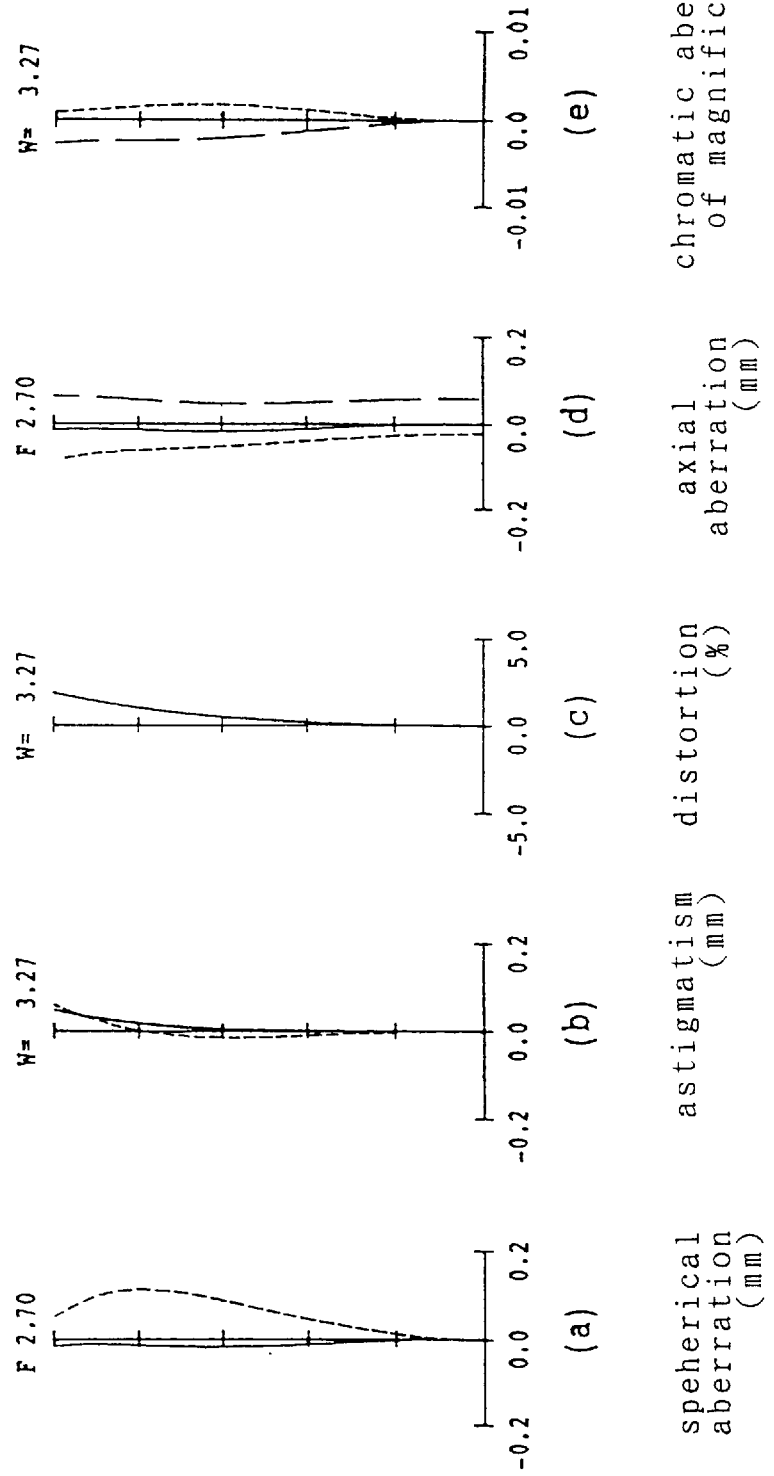
FIG. 29 is a view showing aberration at the telephoto limit of the zoom lens system.

FIG. 27, FIG. 28 and FIG. 29 show aberration capability of the aspherical zoom lens system in the numerical example of the second embodiment.

In these figures, (a) is a drawing of spherical aberration, wherein the solid line represents the value to the d-line and the dotted line represents the sine condition; (b) is a drawing of astigmatism, wherein the solid line represents the sagittal curvature of field and the dotted line represents the meridional curvature of field; (c) is a drawing of distortion aberration and (d) is a drawing of axial aberration, wherein the solid line, the dotted line and the broken line represent the values to the d-line, the F-line and the C-line, respectively; (e) is a drawing of chromatic aberration of magnification, wherein the dotted line and the broken line represent the values to the F-line and the C-line, respectively. From these figures, it is apparent that the zoom lens system according to the above-mentioned concrete numerical example of the embodiment have excellent optical capability.

<<Third Embodiment>>
<Embodiment of a Video Camera, Etc.>

Figure 30:
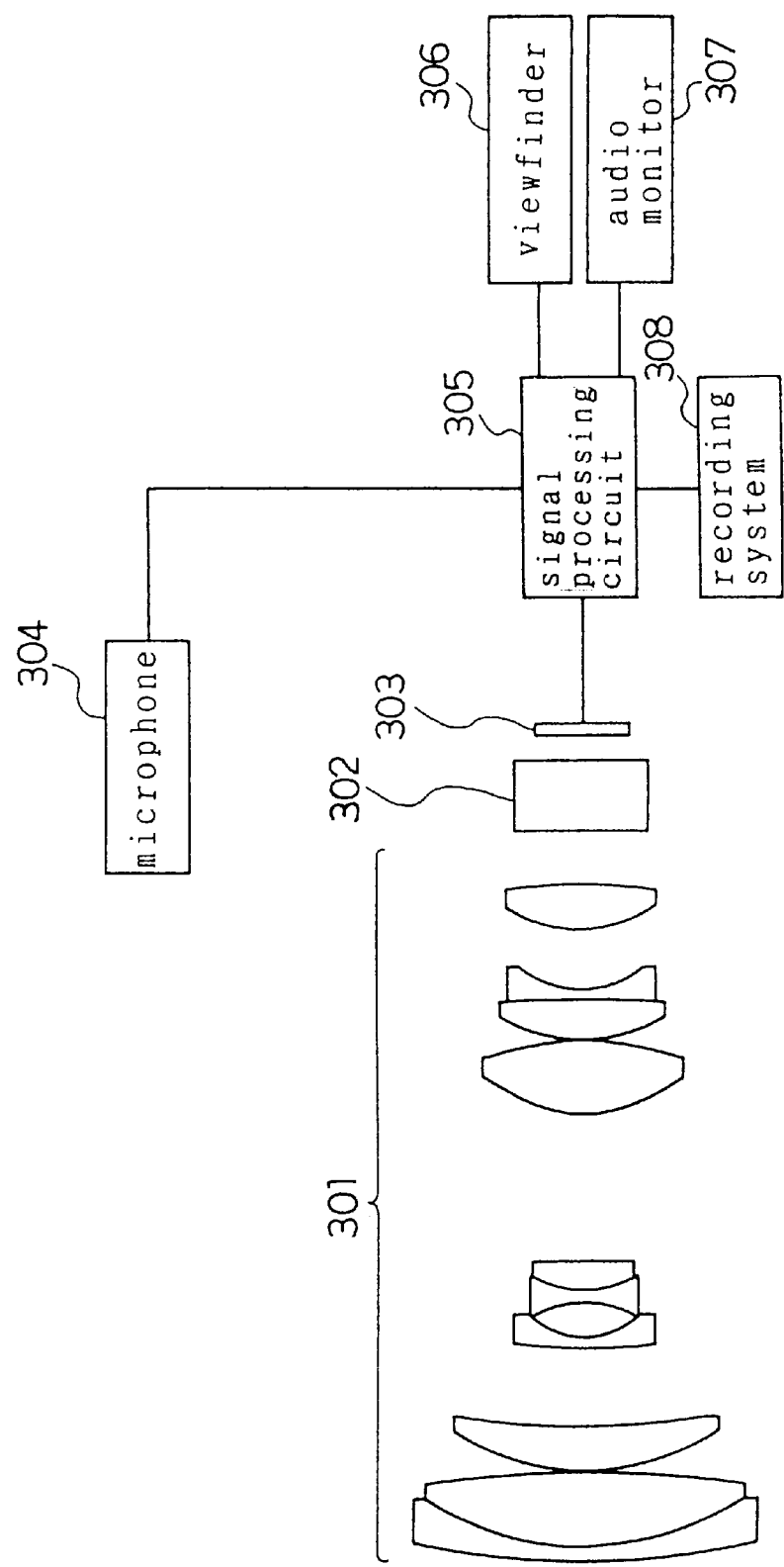
FIG. 30 is a view showing the structure of a video camera using a zoom lens system according to the first embodiment or the second embodiment.

FIG. 30 is a view showing the structure of a video camera using a zoom lens system of the present invention. In the figure, a zoom lens system 301 is structured like the above-described embodiments, and in addition, a low-pass filter 302, an image pickup element 303, a microphone 304, a signal processing circuit 305, a viewfinder 306, an audio monitor 307 and a recording system 308 are basically included. Further, an additional function may be provided.

Figure 31:
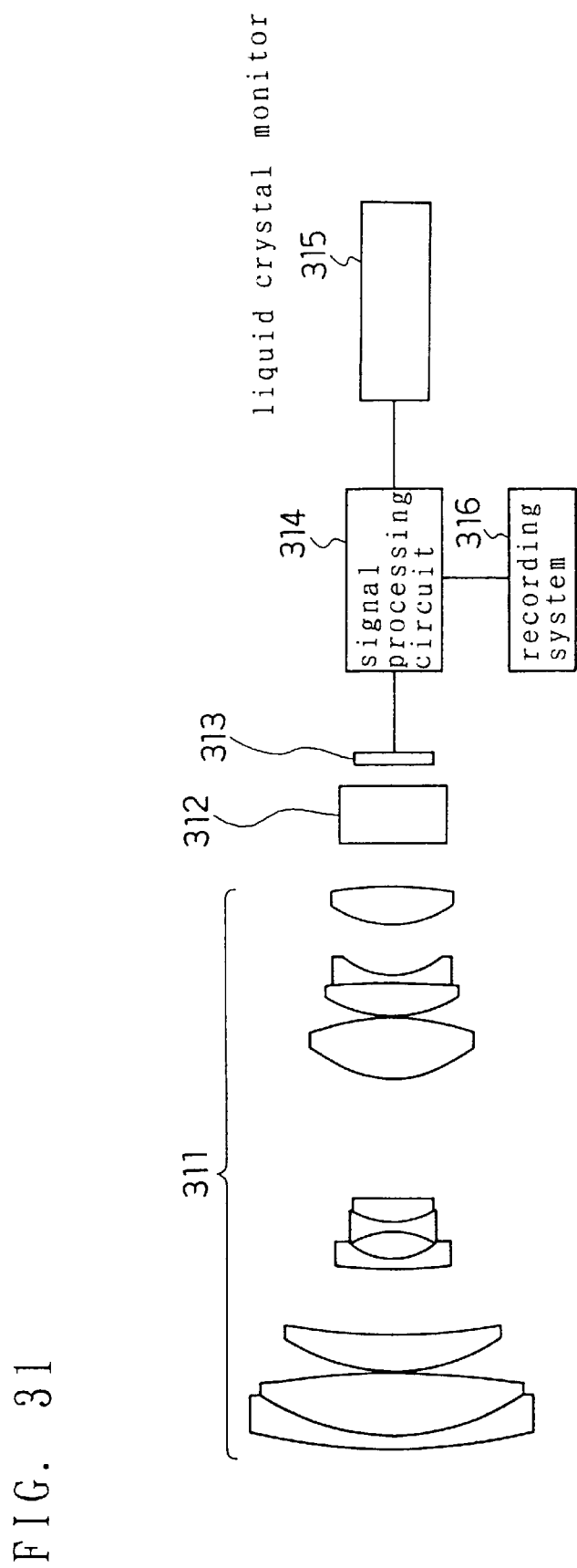
FIG. 31 is a view showing the structure of an electronic still camera using a zoom lens system according to the first embodiment or the second embodiment.
Figure 32:
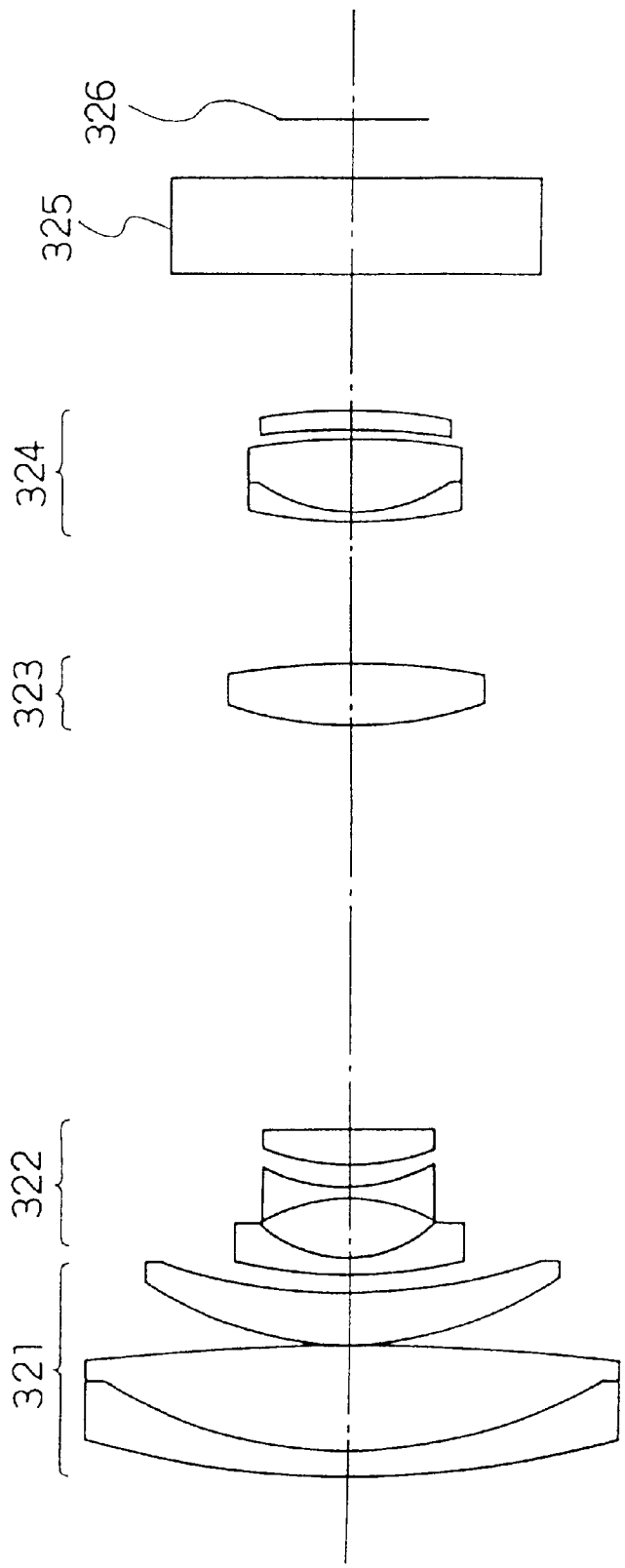
FIG. 32 is a view showing the structure of a conventional zoom lens system.

FIG. 31 is a view showing the structure of an electronic still camera using a zoom lens system of the present invention. In the figure, a zoom lens system 311 is structured like the above-described embodiments, and in addition, a low-pass filter 312, an image pickup element 313, a signal processing circuit 314, a liquid crystal monitor 315 and a recording system 316 are included. The recording system 316 has the function of recording photographic conditions as well as subject images. Further, an additional function may be provided.

Although the invention has been described in its preferred form with a certain degree of particularity, it is understood that the present disclosure of the preferred form has been changed in the details of construction and the combination and arrangement of parts may be resorted to without departing from the scope and the sprite of the invention as hereinafter claimed.

INDUSTRIAL APPLICABILITY

In the zoom lens system of the present invention, a compact and high-performance aspherical zoom lens system with an f-number of approximately 1.4, an angle of view of 59 degree or greater and a zoom ratio of approximately 10× is realized with as few as ten lens elements. Therefore, by using such a zoom lens system in a video camera and an electronic still camera, such a product may be realized that is compact in size, light in weight and has high performance.

We claim:

1. A zoom lens system comprising from the side of an object which is a subject: a first lens unit having positive refractive power and fixed in relation to an image plane; a second lens unit having negative refractive power and performing zooming by moving along an optical axis; a third lens unit having positive refractive power which is fixed in relation to the image plane and performs condensing; and a fourth lens unit having positive refractive power which moves along the optical axis so that the image plane, which varies responding to the movement of said second lens unit and a movement of the object which is the subject, is maintained in a certain position in relation to a reference plane, wherein said first lens unit comprises from said object side: a first lens element of the first lens unit having negative refractive power; a second lens element of the first lens unit having positive refractive power; and a meniscus lens element having positive refractive power and being convex to the object side;

wherein said second lens unit comprises from said object side: a first lens element of the second lens unit having negative refractive power; a second, biconcave lens element having negative refractive power; and a third lens element of the second lens unit having positive refractive power and being convex to the object side surface connected to said biconcave lens element, at least one of the surfaces of said lens elements of said second lens unit being aspherical, wherein said third lens unit comprises from the object side: a first lens element of the third lens unit having positive refractive power; a second lens element of the third lens unit having positive refractive power; and a third lens element of the third lens unit having negative refractive power, at least one of the surfaces of said lens elements of said third lens unit being aspherical, wherein said fourth lens unit comprises at least one lens element of the fourth lens unit, at least one of the surfaces of said lens element of said fourth lens unit being aspherical, wherein, fw is the focal length of the zoom lens system at the wide-angle limit, fi (i=1, 2, 3, 4) is the focal length of an ith lens unit, ω is the half view angle at the wide-angle limit and p3c is the refractive power of the image side surface of said third lens element of the third lens unit, the following is satisfied:

$0.255 < (fw \times \tan\omega)/(f1 \times |f2|)^{1/2} < 0.301$;

$0.643 < fw \times |p3c| < 0.799$;

$0.212 < fw/f1 < 0.232$;

$1.081 < fw/|f2| < 1.205$;

$0.434 < fw/f3 < 0.453$; and $0.376 < fw/f4 < 0.421$.

2. A video camera using a zoom lens system according to claim 1.

3. An electronic still camera using a zoom lens system according to claim 1.

4. A zoom lens system comprising from the side of an object which is a subject: a first lens unit having positive refractive power and fixed in relation to an image plane; a second lens unit having negative refractive power and performing zooming by moving along an optical axis; a third lens unit having positive refractive power which is fixed in relation to the image plane and performs condensing; and a fourth lens unit having positive refractive power which moves along the optical axis so that the image plane, which varies responding to the movement of said second lens unit and a movement of the object which is the subject, is maintained in a certain position in relation to a reference plane, wherein said first lens unit comprises from said object side: a first lens element of the first lens unit having negative refractive power; a second lens element of the first lens unit having positive refractive power; and a meniscus lens element having positive refractive power and being convex to the object side;

wherein said second lens unit comprises from said object side: a first lens element of the second lens unit having negative refractive power; a second, biconcave lens element having negative refractive power; and a third lens element of the second lens unit having positive refractive power and being convex to the object side surface connected to said biconcave lens element, at least one of the surfaces of said lens elements of said second lens unit being aspherical, wherein said third lens unit comprises from the object side: a first lens element of the third lens unit having positive refractive power; a second lens element of the third lens unit having positive refractive power; and a third lens element of the third lens unit having negative refractive power, at least one of the surfaces of said lens elements of said third lens unit being aspherical, wherein said fourth lens unit comprises at least one lens element of the fourth lens unit, at least one of the surfaces of said lens element of said fourth lens unit being aspherical, wherein, in said third lens unit, said first lens element of the third lens unit is a biconvex lens and said third lens element of the third lens unit is disposed so as to be concave to the image side, wherein, when fw is the focal length of the zoom lens system at the wide-angle limit, fi (i=1, 2, 3, 4) is the focal length of an ith lens unit, ω is the half view angle at the wide-angle limit and p3c is the refractive power of the image side surface of said third lens element of the third lens unit, the following is satisfied:

$0.255 < (fw \times \tan\omega)/(f1 \times |f2|)^{1/2} < 0.301;$ $0.643 < fw \times |p3c| < 0.799;$ $0.212 < fw/f1 < 0.232;$ $1.081 < fw/|f2| < 1.205;$ $0.434 < fw/f3 < 0.453;$ and $0.376 < fw/f4 < 0.421.$ 5. A video camera using a zoom lens system according to claim 4.

6. An electronic still camera using a zoom lens system according to claim 4.

7. A zoom lens system comprising from the side of an object which is a subject: a first lens unit having positive refractive power and fixed in relation to an image plane; a second lens unit having negative refractive power and performing zooming by moving along an optical axis; a third lens unit having positive refractive power which is fixed in relation to the image plane and performs condensing; and a fourth lens unit having positive refractive power which moves along the optical axis so that the image plane, which varies responding to the movement of said second lens unit and a movement of the object which is the subject, is maintained in a certain position in relation to a reference plane, wherein said first lens unit comprises from said object side: a first lens element of the first lens unit having negative refractive power, a second lens element of the first lens unit having positive refractive power; and a meniscus lens element having positive refractive power and being convex to the object side;

wherein said second lens unit comprises from said object side: a first lens element of the second lens unit having negative refractive power; a second, biconcave lens element having negative refractive power; and a third lens element of the second lens unit having positive refractive power and being convex to the object side surface connected to said biconcave lens element, at least one of the surfaces of said lens elements of said second lens unit being aspherical, wherein said third lens unit comprises from the object side: a first lens element of the third lens unit having positive refractive power; a second lens element of the third lens unit having positive refractive power; and a third lens element of the third lens unit having negative refractive power, at least one of the surfaces of said lens elements of said third lens unit being aspherical, wherein said fourth lens unit comprises at least one lens element of the fourth lens unit, at least one of the surfaces of said lens element of said fourth lens unit being aspherical, wherein, in said third lens unit, said first lens element of the third lens unit is a biconvex lens, said second lens element of the third lens unit is disposed so as to be convex to the object side, said third lens element of the third lens unit has its object side surface connected to said second lens element of the third lens unit and has its image side surface formed to be concave, and the overall refractive power of said second lens element of the third lens unit and said third lens element of the third lens unit connected to each other is negative, and wherein, when fw is the focal length of the zoom lens system at a wide-angle limit, fi (i=1, 2, 3, 4) is the focal length of an ith lens unit, ω is the half view angle at the wide-angle limit and p3c is the refractive power of the image side surface of said third lens element of the third lens unit, the following is satisfied:

$0.255 < (fw \times \tan\omega)/(f1 \times |f2|)^{1/2} < 0.301;$ $0.643 < fw \times |p3c| < 0.799;$ $0.212 < fw/f1 < 0.232;$ $1.081 < fw/|f2| < 1.205;$ $0.434 < fw/f3 < 0.453;$ and $0.376 < fw/f4 < 0.421.$ 8. A video camera using a zoom lens system according to claim 7.

9. An electronic still camera using a zoom lens system according to claim 7.

10. A zoom lens system comprising from the side of an object which is a subject: a first lens unit having positive refractive power and fixed in relation to an image plane; a second lens unit having negative refractive power and performing zooming by moving along an optical axis; a third lens unit having positive refractive power which is fixed in relation to the image plane and performs condensing; and a fourth lens unit having positive refractive power which moves along the optical axis so that the image plane, which varies responding to the movement of said second lens unit and a movement of the object which is the subject, is maintained in a certain position in relation to a reference plane, wherein said first lens unit comprises from said object side: a first lens element of the first lens unit having negative refractive power; a second lens element of the first lens unit having positive refractive power; and a meniscus lens element having positive refractive power and convex to the object side;

wherein said second lens unit comprises from said object side: a first lens element of the second lens unit having negative refractive power; a second, biconcave lens element having negative refractive power; and a third lens element of the second lens unit having positive refractive power and being convex to the object side surface connected to said biconcave lens element, at least one of the surfaces of said lens elements of said second lens unit being aspherical, wherein said third lens unit comprises from the object side: a first lens element of the third lens unit having positive refractive power; a second lens element of the third lens unit having positive refractive power; and a third lens element of the third lens unit having negative refractive power, at least one of the surfaces of said lens elements of said third lens unit being aspherical, wherein said fourth lens unit comprises at least one lens element of the fourth lens unit, at least one of the surfaces of said lens element of said fourth lens unit is aspherical, wherein, in said third lens unit, said first lens element of the third lens unit is a biconvex lens, said second lens element of the third lens unit is disposed so as to be convex to the object side, said third lens element of the third lens unit has its image side surface formed to be concave, and said first, second and third lens elements of said third lens unit are disposed with spaces therebetween, and wherein, when fw is the focal length of the zoom lens system at a wide-angle limit, fi (i=1, 2, 3, 4) is the focal length of an ith lens unit, $\omega$ is the half view angle at the wide-angle limit and p3c is the refractive power of the image side surface of said third lens element of the third lens unit, the following is satisfied:

$0.255 < (fw \times \tan\omega)/(f1 \times |f2|)^{1/2} < 0.301;$ $0.643 < fw \times |p3c < 0.799;$ $0.212 < fw/f1 < 0.232;$ $1.081 < fw/|f2| < 1.205;$ $0.434 < fw/f3 < 0.453;$ and $0.376 < fw/f4 < 0.421.$ 11. A video camera using a zoom lens system according to claim 10.

12. An electronic still camera using a zoom lens system according to claim 10.

* * * * *